United States Patent
Patel et al.

(10) Patent No.: US 11,329,722 B2
(45) Date of Patent: May 10, 2022

(54) OPTICAL TERMINALS

(71) Applicant: RELATIVE DYNAMICS INCORPORATED, Greenbelt, MD (US)

(72) Inventors: Kush Patel, Laurel, MD (US); Michael Krainak, Fulton, MD (US)

(73) Assignee: RELATIVE DYNAMICS INCORPORATED, Laurel, MD (US)

( * ) Notice: Subject to any disclaimer, the term of this patent is extended or adjusted under 35 U.S.C. 154(b) by 0 days.

(21) Appl. No.: 17/199,316

(22) Filed: Mar. 11, 2021

(65) Prior Publication Data

US 2021/0306072 A1 Sep. 30, 2021

Related U.S. Application Data

(60) Provisional application No. 63/000,963, filed on Mar. 27, 2020.

(51) Int. Cl.
| | | |
|---|---|---|
| *H04B 10/112* | (2013.01) | |
| *H04B 10/50* | (2013.01) | |
| *H04B 10/118* | (2013.01) | |
| *G02B 26/06* | (2006.01) | |

(52) U.S. Cl.
CPC ....... *H04B 10/1125* (2013.01); *H04B 10/503* (2013.01); *G02B 26/06* (2013.01); *H04B 10/118* (2013.01); *H04B 10/1123* (2013.01)

(58) Field of Classification Search
CPC .............. H04B 10/1125; H04B 10/503; H04B 10/1123

USPC .......................................................... 398/129
See application file for complete search history.

(56) References Cited

U.S. PATENT DOCUMENTS

| | | | |
|---|---|---|---|
| 4,709,415 A | 11/1987 | Prisco | |
| 4,715,706 A | 12/1987 | Wang | |
| 4,977,593 A | 12/1990 | Ballance | |
| 5,131,741 A | 7/1992 | Zweben | |
| 5,375,058 A | 12/1994 | Bass | |
| 5,418,804 A | 5/1995 | Zhiglinsky et al. | |
| 5,448,053 A * | 9/1995 | Rhoads .............. | G01J 9/00 250/201.9 |
| 5,454,102 A | 9/1995 | Tang et al. | |
| 5,532,819 A * | 7/1996 | Ishizuka ............. | G01D 5/38 250/237 G |
| 5,612,945 A | 3/1997 | Van Rosmalen | |
| 5,666,402 A | 9/1997 | Griffin | |
| 5,675,443 A | 10/1997 | Dorsel | |
| 5,717,209 A | 2/1998 | Bigman et al. | |
| 5,729,512 A | 3/1998 | Alon | |
| 5,751,413 A | 5/1998 | Chung et al. | |
| 5,896,480 A | 4/1999 | Scharf et al. | |
| 5,945,252 A | 8/1999 | Sokoluk et al. | |
| 6,027,855 A | 2/2000 | Sokoluk et al. | |
| 6,052,279 A | 4/2000 | Friend et al. | |
| 6,064,942 A | 5/2000 | Johnson et al. | |
| 6,069,857 A | 5/2000 | Schell et al. | |

(Continued)

*Primary Examiner* — Abbas H Alagheband
(74) *Attorney, Agent, or Firm* — Loza & Loza LLP; Kevin L. Soules

(57) ABSTRACT

A method, system, and apparatus are disclosed for a free-space communication optical terminal comprising an optical telescope (or telescopes) for bidirectional communication and navigation, a pointing and tracking system for transmission and reception of narrow optical beams, and a modem.

18 Claims, 19 Drawing Sheets

(56) References Cited

U.S. PATENT DOCUMENTS

| | | | |
|---|---|---|---|
| 6,076,072 A | 6/2000 | Libman | |
| 6,193,160 B1 | 2/2001 | Zembitski | |
| 6,198,559 B1 | 3/2001 | Gehlot | |
| 6,269,203 B1 | 7/2001 | Davies et al. | |
| 6,301,059 B1 | 10/2001 | Huang et al. | |
| 6,396,801 B1 | 5/2002 | Upton et al. | |
| 6,404,798 B1 | 6/2002 | Leckel et al. | |
| 6,407,535 B1* | 6/2002 | Friedman | B64D 41/00 244/1 R |
| 6,490,381 B1 | 12/2002 | Adair et al. | |
| 6,518,584 B1 | 2/2003 | Woodruff | |
| 6,520,652 B1 | 2/2003 | Huang et al. | |
| 6,538,778 B1 | 3/2003 | Leckel et al. | |
| 6,539,144 B1 | 3/2003 | Lu | |
| 6,574,262 B1 | 6/2003 | Crossley et al. | |
| 6,577,417 B1 | 6/2003 | Khoury | |
| 6,587,214 B1 | 7/2003 | Munks | |
| 6,594,086 B1 | 7/2003 | Pakdaman | |
| 6,661,975 B1 | 12/2003 | Hall et al. | |
| 6,665,115 B2 | 12/2003 | Popov et al. | |
| 6,711,458 B1 | 3/2004 | Kofoed | |
| 6,741,349 B1 | 5/2004 | Sweatt et al. | |
| 6,807,374 B1 | 10/2004 | Imajo et al. | |
| 6,826,371 B1 | 11/2004 | Bauch et al. | |
| 6,847,997 B1 | 1/2005 | Kleiner | |
| 6,891,864 B2 | 5/2005 | Vahala et al. | |
| 6,919,989 B1 | 7/2005 | Deng et al. | |
| 7,202,613 B2 | 4/2007 | Morgan et al. | |
| 7,376,068 B1 | 5/2008 | Khoury | |
| 7,403,281 B2* | 7/2008 | Carron | G01J 3/44 356/301 |
| 7,424,225 B1 | 9/2008 | Elliott | |
| 7,522,628 B1* | 4/2009 | Elliott | H04Q 11/0062 370/328 |
| 7,558,479 B1 | 7/2009 | Robinson | |
| 7,826,752 B1 | 11/2010 | Zanoni et al. | |
| 7,859,748 B2 | 12/2010 | Shafer et al. | |
| 8,396,369 B1 | 3/2013 | Farmer et al. | |
| 9,112,615 B1 | 8/2015 | Thesling et al. | |
| 9,119,127 B1 | 8/2015 | Henry et al. | |
| 9,154,559 B1 | 10/2015 | Bovee et al. | |
| 9,312,929 B2 | 4/2016 | Forenza et al. | |
| 9,571,205 B1 | 2/2017 | Suarez et al. | |
| 9,608,692 B2 | 3/2017 | Bennett et al. | |
| 9,699,785 B2 | 7/2017 | Henry et al. | |
| 9,749,053 B2 | 8/2017 | Henry et al. | |
| 9,819,403 B2 | 11/2017 | Forenza et al. | |
| 9,826,537 B2 | 11/2017 | Forenza et al. | |
| 9,866,309 B2 | 1/2018 | Bennett et al. | |
| 9,882,277 B2 | 1/2018 | Henry et al. | |
| 9,912,381 B2 | 3/2018 | Bennett et al. | |
| 9,992,038 B2 | 6/2018 | Youngbull et al. | |
| 10,009,065 B2 | 6/2018 | Henry et al. | |
| 10,020,587 B2 | 7/2018 | Henry et al. | |
| 10,027,398 B2 | 7/2018 | Bennett et al. | |
| 10,103,801 B2 | 10/2018 | Bennett et al. | |
| 10,142,086 B2 | 11/2018 | Bennett et al. | |
| 10,154,493 B2 | 12/2018 | Bennett et al. | |
| 10,200,094 B2 | 2/2019 | Forenza et al. | |
| 10,263,711 B2 | 4/2019 | Lacovara | |
| 10,264,586 B2 | 4/2019 | Beattie, Jr. et al. | |
| 10,277,290 B2 | 4/2019 | Forenza et al. | |
| 10,320,455 B2 | 6/2019 | Forenza et al. | |
| 10,333,629 B2 | 6/2019 | Lacovara | |
| 10,348,391 B2 | 7/2019 | Bennett et al. | |
| 10,348,410 B1 | 7/2019 | Charlton et al. | |
| 10,349,417 B2 | 7/2019 | Forenza et al. | |
| 10,537,015 B1* | 1/2020 | Vinciarelli | H05K 3/18 |
| 2001/0001578 A1 | 5/2001 | Blais | |
| 2001/0033587 A1 | 10/2001 | Painter et al. | |
| 2002/0008880 A1 | 1/2002 | Dewitte et al. | |
| 2002/0085646 A1 | 7/2002 | Brown et al. | |
| 2002/0097376 A1 | 7/2002 | Applegate et al. | |
| 2002/0111546 A1 | 8/2002 | Cook et al. | |
| 2002/0125589 A1 | 9/2002 | Katzir | |
| 2002/0154311 A1 | 10/2002 | Ivarsson | |
| 2002/0180966 A1 | 11/2002 | Munks et al. | |
| 2002/0191266 A1 | 12/2002 | Melloni et al. | |
| 2003/0002834 A1 | 1/2003 | Brown et al. | |
| 2003/0020985 A1 | 1/2003 | Lagasse et al. | |
| 2003/0040130 A1 | 2/2003 | Mayur et al. | |
| 2003/0077051 A1 | 4/2003 | Meadowcroft | |
| 2003/0112839 A1 | 6/2003 | Xu et al. | |
| 2003/0128912 A1* | 7/2003 | Dames | G02B 6/3508 385/17 |
| 2003/0077024 A1 | 9/2003 | Nishimura | |
| 2003/0164782 A1 | 9/2003 | Stickle | |
| 2003/0192780 A1 | 10/2003 | Ala-Kleme et al. | |
| 2003/0216965 A1 | 11/2003 | Libman | |
| 2003/0218750 A1 | 11/2003 | Friberg et al. | |
| 2003/0222380 A1 | 12/2003 | Katzir | |
| 2004/0008811 A1 | 1/2004 | Yamamoto | |
| 2004/0008996 A1 | 1/2004 | Aronson et al. | |
| 2004/0028415 A1 | 2/2004 | Eiselt | |
| 2004/0039588 A1 | 2/2004 | Libman | |
| 2004/0047550 A1 | 3/2004 | Guo et al. | |
| 2004/0056657 A1 | 3/2004 | Hennessy | |
| 2004/0081469 A1* | 4/2004 | Conway | H04B 10/677 398/188 |
| 2004/0150865 A1 | 8/2004 | Chen et al. | |
| 2004/0152082 A1 | 8/2004 | Troup et al. | |
| 2004/0169212 A1 | 9/2004 | Herget | |
| 2004/0208593 A1 | 10/2004 | Bloom | |
| 2004/0208613 A1 | 10/2004 | Sinha et al. | |
| 2004/0212882 A1 | 10/2004 | Liang et al. | |
| 2004/0218793 A1 | 11/2004 | Corson et al. | |
| 2004/0218795 A1 | 11/2004 | Zhou et al. | |
| 2004/0262008 A1 | 12/2004 | Deans et al. | |
| 2005/0063497 A1 | 3/2005 | Mahlab et al. | |
| 2005/0069325 A1 | 3/2005 | Cicchiello et al. | |
| 2005/0097585 A1 | 5/2005 | Pan | |
| 2005/0128090 A1 | 6/2005 | Gerszberg et al. | |
| 2005/0156583 A1 | 7/2005 | Nachamiev et al. | |
| 2005/0201752 A1 | 9/2005 | Bai | |
| 2005/0205757 A1 | 9/2005 | Olszak | |
| 2005/0248758 A1* | 11/2005 | Carron | G01J 3/44 356/301 |
| 2006/0004642 A1 | 1/2006 | Libman | |
| 2006/0018475 A1 | 1/2006 | Vig et al. | |
| 2006/0076459 A1* | 4/2006 | Dailey | H01Q 1/125 244/173.1 |
| 2006/0093376 A1 | 5/2006 | Mitchell et al. | |
| 2006/0114956 A1 | 6/2006 | Sandsrom et al. | |
| 2006/0114957 A1 | 6/2006 | Algots et al. | |
| 2006/0146409 A1 | 7/2006 | Yanson et al. | |
| 2006/0192949 A1 | 8/2006 | Bills et al. | |
| 2006/0016972 A1 | 9/2006 | Lagasse | |
| 2006/0198521 A1 | 9/2006 | Young et al. | |
| 2006/0283954 A1 | 12/2006 | Ralph et al. | |
| 2006/0285790 A1 | 12/2006 | Young | |
| 2007/0009263 A1 | 1/2007 | Liu | |
| 2007/0031150 A1* | 2/2007 | Fisher | H04B 10/1125 398/128 |
| 2007/0138344 A1* | 6/2007 | Cepollina | B64G 4/00 244/172.5 |
| 2007/0177254 A1 | 8/2007 | Ghera et al. | |
| 2007/0183782 A1 | 8/2007 | Farr et al. | |
| 2007/0195661 A1 | 8/2007 | Raaymakers | |
| 2007/0223929 A1* | 9/2007 | Graves | H04B 10/1121 398/122 |
| 2007/0237181 A1 | 10/2007 | Cho et al. | |
| 2007/0245956 A1* | 10/2007 | Ruuttu | B23K 26/03 118/620 |
| 2008/0043339 A1 | 2/2008 | Rubinstein et al. | |
| 2008/0063401 A1 | 3/2008 | Agazzi | |
| 2008/0068613 A1 | 3/2008 | Kuchel | |
| 2008/0069173 A1 | 3/2008 | Shchukin et al. | |
| 2008/0156876 A1 | 7/2008 | Vinogradov | |
| 2008/0205250 A1 | 8/2008 | Padly | |
| 2008/0247345 A1 | 10/2008 | Bahar | |
| 2008/0247759 A1 | 10/2008 | Bahar | |
| 2009/0024038 A1 | 1/2009 | Arnold | |
| 2009/0073579 A1 | 3/2009 | Chen | |

(56) References Cited

U.S. PATENT DOCUMENTS

| | | |
|---|---|---|
| 2009/0116845 A1 | 5/2009 | Li et al. |
| 2009/0185810 A1 | 7/2009 | Kaplan et al. |
| 2009/0201249 A1 | 8/2009 | Yamamoto |
| 2009/0212969 A1 | 8/2009 | Voss |
| 2009/0214221 A1 | 8/2009 | Li et al. |
| 2009/0295721 A1 | 12/2009 | Yamamoto et al. |
| 2010/0001953 A1 | 1/2010 | Yamamoto et al. |
| 2010/0014802 A1 | 1/2010 | Chapman et al. |
| 2010/0042389 A1 | 2/2010 | Farruggia et al. |
| 2010/0045599 A1 | 2/2010 | Yamamoto |
| 2010/0046958 A1 | 2/2010 | Awadalla et al. |
| 2010/0169824 A1 | 7/2010 | Sawai et al. |
| 2010/0169843 A1 | 7/2010 | Yamamoto et al. |
| 2010/0172611 A1 | 7/2010 | Joyner et al. |
| 2010/0278536 A1 | 11/2010 | Mak et al. |
| 2010/0309123 A1 | 12/2010 | Sawai et al. |
| 2011/0013649 A1 | 1/2011 | Bourgart |
| 2011/0038642 A1 | 2/2011 | Mahlab et al. |
| 2011/0097083 A1 | 4/2011 | Barrett |
| 2011/0249978 A1 | 10/2011 | Sasaki |
| 2012/0051734 A1 | 3/2012 | Weiss et al. |
| 2012/0126992 A1 | 5/2012 | Rodney et al. |
| 2012/0224824 A1 | 9/2012 | Beresnev et al. |
| 2012/0251031 A1 | 10/2012 | Suarez et al. |
| 2012/0275794 A1 | 11/2012 | Melamed et al. |
| 2012/0289813 A1 | 11/2012 | Arnold |
| 2013/0121704 A1 | 5/2013 | Gall et al. |
| 2013/0129348 A1 | 5/2013 | Mak et al. |
| 2013/0170834 A1 | 7/2013 | Cho et al. |
| 2013/0176635 A1* | 7/2013 | Nakada .................. G02B 7/022 359/819 |
| 2013/0215069 A1 | 8/2013 | Lee et al. |
| 2013/0236169 A1 | 9/2013 | Gaudette et al. |
| 2014/0267722 A1* | 9/2014 | Riot ..................... G02B 27/646 348/144 |
| 2014/0270749 A1* | 9/2014 | Miniscalco .......... H04B 10/038 398/5 |
| 2014/0301259 A1 | 10/2014 | Homchaudhuri et al. |
| 2014/0308047 A1 | 10/2014 | Mak et al. |
| 2014/0341595 A1 | 11/2014 | Harley et al. |
| 2014/0376914 A1* | 12/2014 | Miniscalco ........ H04B 7/18504 398/58 |
| 2015/0023245 A1 | 1/2015 | Du et al. |
| 2015/0132004 A1 | 5/2015 | Farr et al. |
| 2015/0138996 A1 | 5/2015 | Ince et al. |
| 2015/0156568 A1 | 6/2015 | Byers |
| 2015/0246711 A1 | 9/2015 | Lee |
| 2015/0349881 A1 | 12/2015 | Byers |
| 2015/0372769 A1 | 12/2015 | Farr et al. |
| 2016/0036389 A1 | 2/2016 | Balteanu et al. |
| 2016/0050470 A1 | 2/2016 | Swinkels et al. |
| 2016/0094192 A1 | 3/2016 | Khesbak et al. |
| 2016/0117461 A1 | 4/2016 | Yeh et al. |
| 2016/0121009 A1 | 5/2016 | Farr et al. |
| 2016/0127042 A1 | 5/2016 | Farr et al. |
| 2016/0182140 A1* | 6/2016 | DeVaul .................. H04B 10/11 398/115 |
| 2016/0231515 A1 | 8/2016 | Byun |
| 2016/0277118 A1 | 9/2016 | Chatelain et al. |
| 2016/0277124 A1 | 9/2016 | Li et al. |
| 2016/0316124 A1 | 10/2016 | Bessettes et al. |
| 2016/0334793 A1 | 11/2016 | Celikkol et al. |
| 2017/0019171 A1 | 1/2017 | Doucet et al. |
| 2017/0023611 A1 | 1/2017 | Martinez-Martin et al. |
| 2017/0126352 A1 | 5/2017 | Chen et al. |
| 2017/0180050 A1 | 6/2017 | Littlewood et al. |
| 2017/0207849 A1 | 7/2017 | Sinclair et al. |
| 2017/0251192 A1* | 8/2017 | Bridges ................ H04N 13/122 |
| 2017/0265220 A1 | 9/2017 | Andreoli-Fang et al. |
| 2017/0291670 A1 | 10/2017 | Johnson |
| 2017/0296303 A1 | 10/2017 | Tod et al. |
| 2017/0310392 A1 | 10/2017 | Boertjes |
| 2017/0339706 A1 | 11/2017 | Andreoli-Fang et al. |
| 2017/0346591 A1 | 11/2017 | Chedore et al. |
| 2018/0103466 A1 | 4/2018 | Andreoli-Fang |
| 2018/0205454 A1 | 7/2018 | Shiner et al. |
| 2018/0255557 A1 | 9/2018 | Andreoli-Fang |
| 2018/0295429 A1 | 10/2018 | Swinkels et al. |
| 2018/0341802 A1 | 11/2018 | Stern et al. |
| 2018/0351646 A1 | 12/2018 | Seo et al. |
| 2018/0359029 A1 | 12/2018 | Shiner et al. |
| 2018/0359811 A1 | 12/2018 | Verzun et al. |
| 2019/0028310 A1 | 1/2019 | Jones et al. |
| 2019/0166363 A1 | 5/2019 | Zhang et al. |
| 2019/0215586 A1 | 7/2019 | Swinkels et al. |
| 2020/0322056 A1* | 10/2020 | Kay .................... H04B 7/2041 |
| 2020/0371276 A1* | 11/2020 | Carrigan ............ G02B 27/0977 |
| 2021/0067248 A1* | 3/2021 | Nykolak .............. H04B 10/118 |
| 2021/0250093 A1* | 8/2021 | Dickson ............. H04B 10/1123 |
| 2021/0310938 A1* | 10/2021 | Körner .................... G01J 3/453 |

* cited by examiner

OPTICAL TERMINALS

CROSS REFERENCE TO RELATED APPLICATIONS

This patent application claims the priority and benefit under 35 U.S.C. § 119(e) of U.S. Provisional Patent Application Ser. No. 63/000,963 filed Mar. 27, 2020, entitled "OPTICAL TERMINALS." U.S. Provisional Patent Application Ser. No. 63/000,963 is herein incorporated by reference in its entirety.

TECHNICAL FIELD

Embodiments are generally related to the field of transceivers. Embodiments are also related to optical transceivers. Embodiments are further related to communications systems for space-to-ground and space-to-space applications. Embodiments are further related to methods and systems for high-bandwidth communications to and from low earth orbit and geosynchronous orbit.

Embodiments are further related to an optical terminal for free-space communication. The optical terminal provides a means to communicate and navigate over a range of distances (kilometers to megameters) using information impressed on an optical carrier that propagates in free-space.

BACKGROUND

Recent acceleration of the commercial space industry is driving unprecedented research into space communications technology. Current commercial communication technologies for space systems employ radio frequency (RF), a reliable and proven form of communication that is robust to most atmospheric effects. However, current RF systems, are limited to single channel data rates of approximately 1 Gbps.

Investigation of laser communication technology has been ongoing. In the 1980s, preliminary work determined the requirements for high-power lasers to provide communications capabilities. Preliminary demonstrations of space-based laser communication were performed via the Artemis spacecraft's SILEX system (50 Mbps LEO-to-GEO). Such demonstrations were technically significant, but practically limited by the significant mass (157 kg) and power (150 W) requirements necessary even for limited data transmission.

Advancements in energy capture and storage, laser manufacturing, and electronics miniaturization have helped drive improvements to space-based laser communication. Several programs in the last decade have demonstrated the technological feasibility of laser communications. For example, the Lunar Laser Communications Demonstration (LLCD) on the LADEE mission downlinked data (622 Mbps) from lunar orbit. Similarly, OPALS transmitted HD video from the International Space Station at nearly 200 Mbps. Such demonstrations have illustrated the possibility of laser communications even in a variety of day/night and weather conditions, by successfully transmitting under clear, and even partially cloudy skies. As such, the demonstrations have established that space-to-ground laser communication may be consistent and relatively reliable under certain conditions.

More recently, the European Data Relay System (EDRS) conducted space-to-space laser communications at 1.8 Gbps. Ongoing testing aims to prove the capability from ground-to-space at increasingly higher altitudes and with increased reliability.

High-speed communication is a vital aspect of spacecraft command and telemetry, and is critically important for technologically advanced science payloads that generate large data volumes. Therefore, there is a need in the art for advanced optical transceiver systems, as disclosed herein, that will help maximize the value of the next generation of information-heavy space payloads, and that support critical enhancements for exploration throughout the solar system.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

The present embodiments relate to optical terminals that provide a means to communicate and navigate over a range of distances (kilometers to megameters) using information impressed on an optical carrier that propagates in free-space.

It is an aspect of the disclosed embodiments to provide a telescope comprising an optical refractor.

It is an aspect of the disclosed embodiments to provide a telescope body and optics enclosed in an outer shell shroud.

It is an aspect of the disclosed embodiments for the outer shell shroud to be constructed from a metal or composite material that is manufacturable using compression, injection or other such molding techniques.

It is an aspect of the disclosed embodiments for the telescope body to be constructed from a metal or composite material that is manufacturable using compression, injection or other molding techniques.

It is an aspect of the disclosed embodiments for the shroud and telescope body to be covered with high thermal conductivity material or coating.

It is an aspect of the disclosed embodiments for the shroud and telescope body emissivity to be engineered with a paint or coating.

It is an aspect of the disclosed embodiments for the transceiver to comprise a telecommunications optical transceiver.

It is an aspect of the disclosed embodiments for the shroud, telescope body and optics to include an array of microheaters and thermistors with a control system, by way of control loops.

It is an aspect of the disclosed embodiments for the telecommunication receiver portion input to be a multimode fiber (even if the transceiver's intended receiver input for fiber optic terrestrial communication is a single mode fiber).

It is an aspect of the disclosed embodiments for the optical receiver to be a multimode fiberoptic amplifier.

It is an aspect of the disclosed embodiments for a gimbal-rotary-stage mechanism to be a piezoelectric-ultrasonic motor.

It is an aspect of the disclosed embodiments for the distance between two optical terminals to be measured using an algorithm associated with each terminal's clock recovery circuitry.

It is an aspect of the disclosed embodiments for the angle between two optical terminals to be measured using an algorithm associated with each terminals' available pointing sensors (spacecraft sensors, actuators, gimbals, etc.).

It is an aspect of the disclosed embodiments for the distance and angular information to be combined with the available platform sensors for navigation.

Accordingly, in certain embodiments an optical terminal comprises an optical telescope configured to receive and transmit light signals, a pointing and tracking system, and a modem. The optical telescope further can further comprise an optical refractor telescope. The refractor telescope further comprises an aspheric lens and an aperture stop. In certain embodiments, the refractor telescope further comprises a quad cell detector.

In certain embodiments, the pointing and tracking system further comprises a fiber optic transmitter connected to a piezoelectric transducer configured for collimation adjustment and includes a fiber optic receiver. The pointing and tracking system can further comprise at least one ultrasonic piezoelectric rotary stage operably connected to a telescope shroud, the telescope shroud configured around the optical telescope.

In certain embodiments, the optical terminal further comprises a coating configured on a housing of the optical telescope, the coating comprising a thermally conductive coating.

In certain embodiments, the optical terminal further comprises an elevation gimbal configured to adjust the elevation of the shroud and an azimuth gimbal configured to adjust the azimuth of the shroud.

In certain embodiments, the optical terminal further comprises at least one microheater configured on the optical telescope and at least one thermistor configured on the optical telescope.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
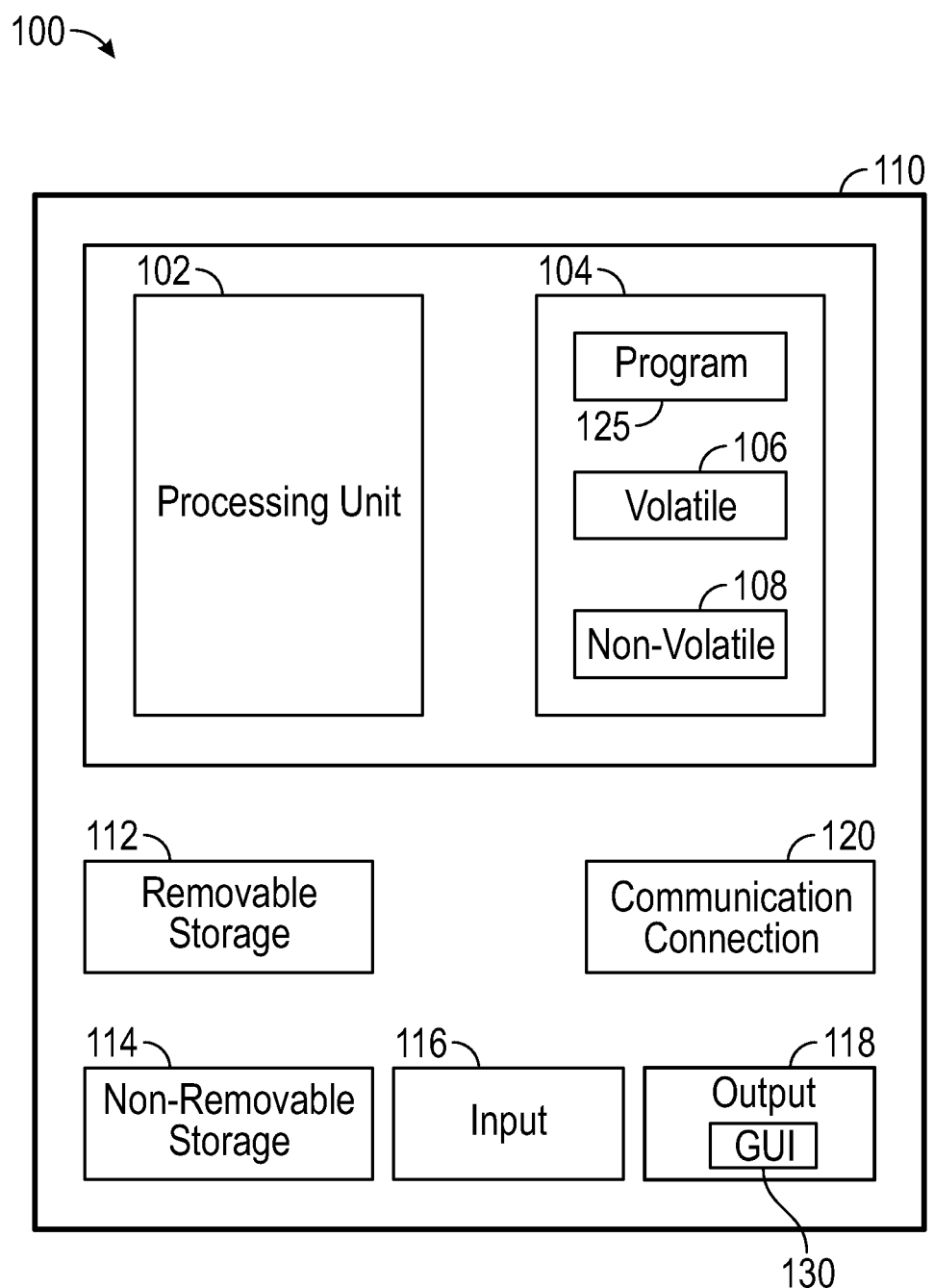
FIG. 1 depicts a block diagram of a computer system which is implemented in accordance with the disclosed embodiments.

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
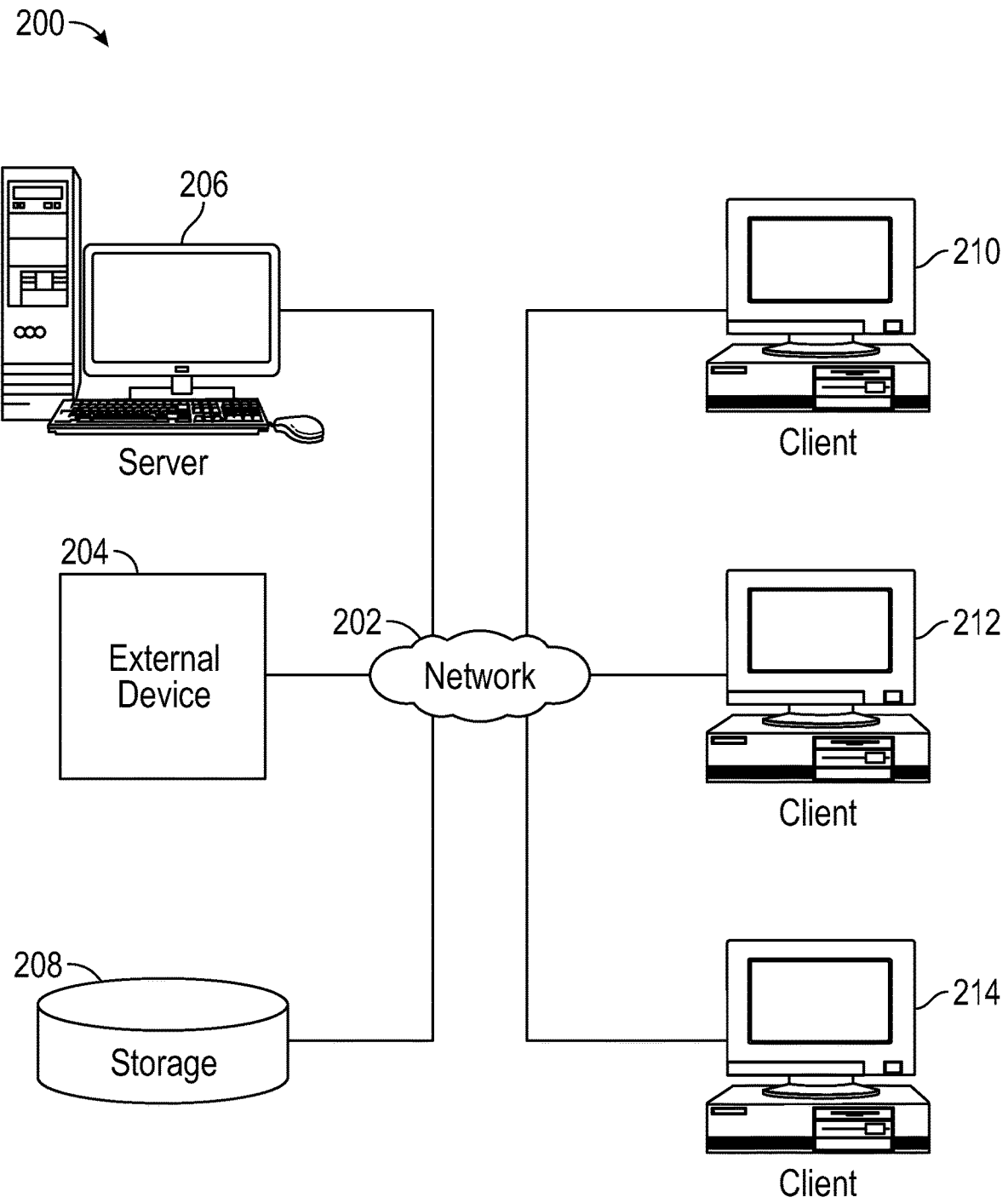
FIG. 2 depicts a graphical representation of a network of data-processing devices in which aspects of the present embodiments may be implemented.
Figure 3:
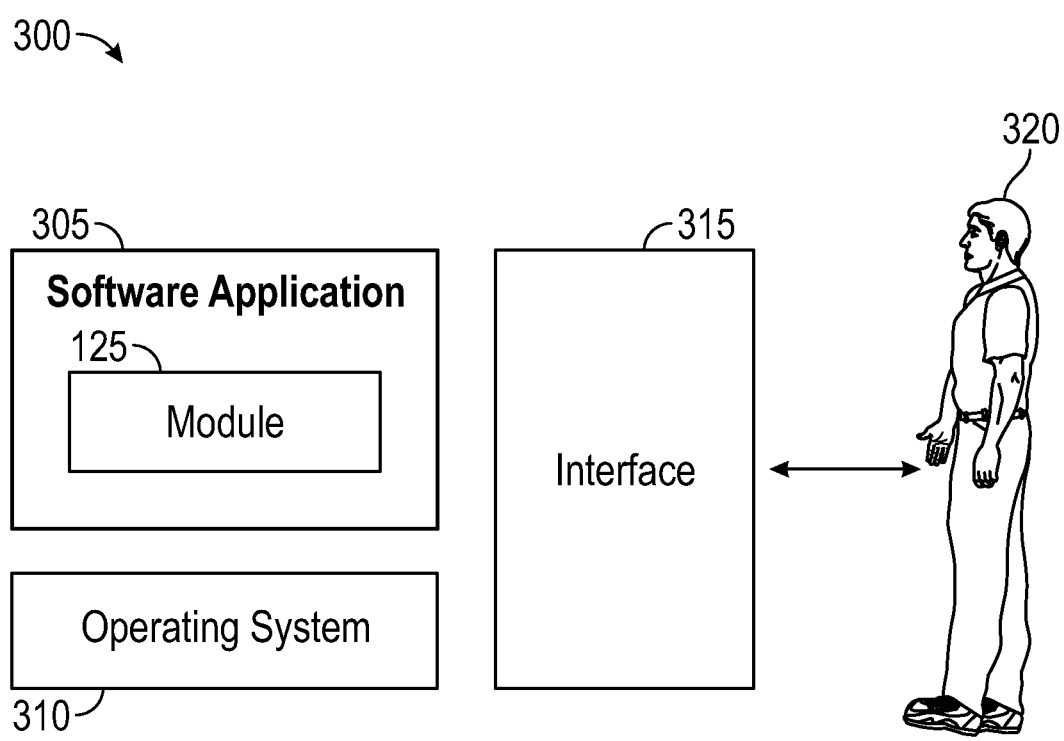
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, actuators, speakers, "internet of things" devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, driver, signal generator, or other such device.

In the depicted example, device 204, server 206, and clients 210, 212, and 214 connect to network 202 along with storage unit 208. Clients 210, 212, and 214 may be, for example, personal computers or network computers, handheld devices, mobile devices, tablet devices, smart phones, personal digital assistants, controllers, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers comprising thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, LabView and the like. Therefore, the descriptions of the exemplary embodiments, which follow, are for purposes of illustration and not considered a limitation.

The embodiments disclosed herein are directed to systems and methods for transmitting data with optical transceivers, that support next generation space communication. In various aspects, an optical communications platform and architecture is disclosed, that enables high data rate space-to-ground and space-to-space communication at size, weight, and power, plus cost (SWaP-C) for broad operational purposes. In certain aspects, the software associated with the systems disclosed herein is highly configurable. Software configurability greatly enhances the broad usability of the optical communication system. The software offers utility for a variety of mission types, enables on-the-fly adaptation to new mission requirements, and supports space-to-ground and space-to-space applications.

In certain embodiments, the systems and methods disclosed herein can produce ground-to-ground laser communication at data rates of up to 40 Gbps given certain environmental conditions. Space-based laser communications, as disclosed herein, address the technically difficult environments associated with space-based communication which include radiation saturated environments and significant launch loads, both of which can cause misalignments and performance loss in transmission and reception in even a well-calibrated device. The embodiments further address jitter related issues which can reduce data volumes and cause handshake issues, and for low-altitude orbits, the precision required for pointing during relatively high-speed passes.

The disclosed embodiments further address issues associated with data transmission from space, which requires signaling through the atmosphere. Atmosphere adds noise that can washout data. The disclosed transmitters can be robust to dispersion; a particularly difficult challenge at high altitudes (GEO and above). Both issues are addressed in view of the spacecraft solar array and battery limitations.

Furthermore, the embodiments address limitations on the receiver end. For example, a large telescope front-end can quickly overburden most spacecraft in size and mass, and the baseline required to properly collect incoming signals potentially adds to both of these. A spacecraft receiving data from a ground source must contend with optical noise from Earth; this can also be true for space-to-space signals if the transmitter is near a noise source. As with transmission, thermal variations can cause receiver performance concerns.

The current embodiments address these issues to provide better laser communication systems.

Figure 4:
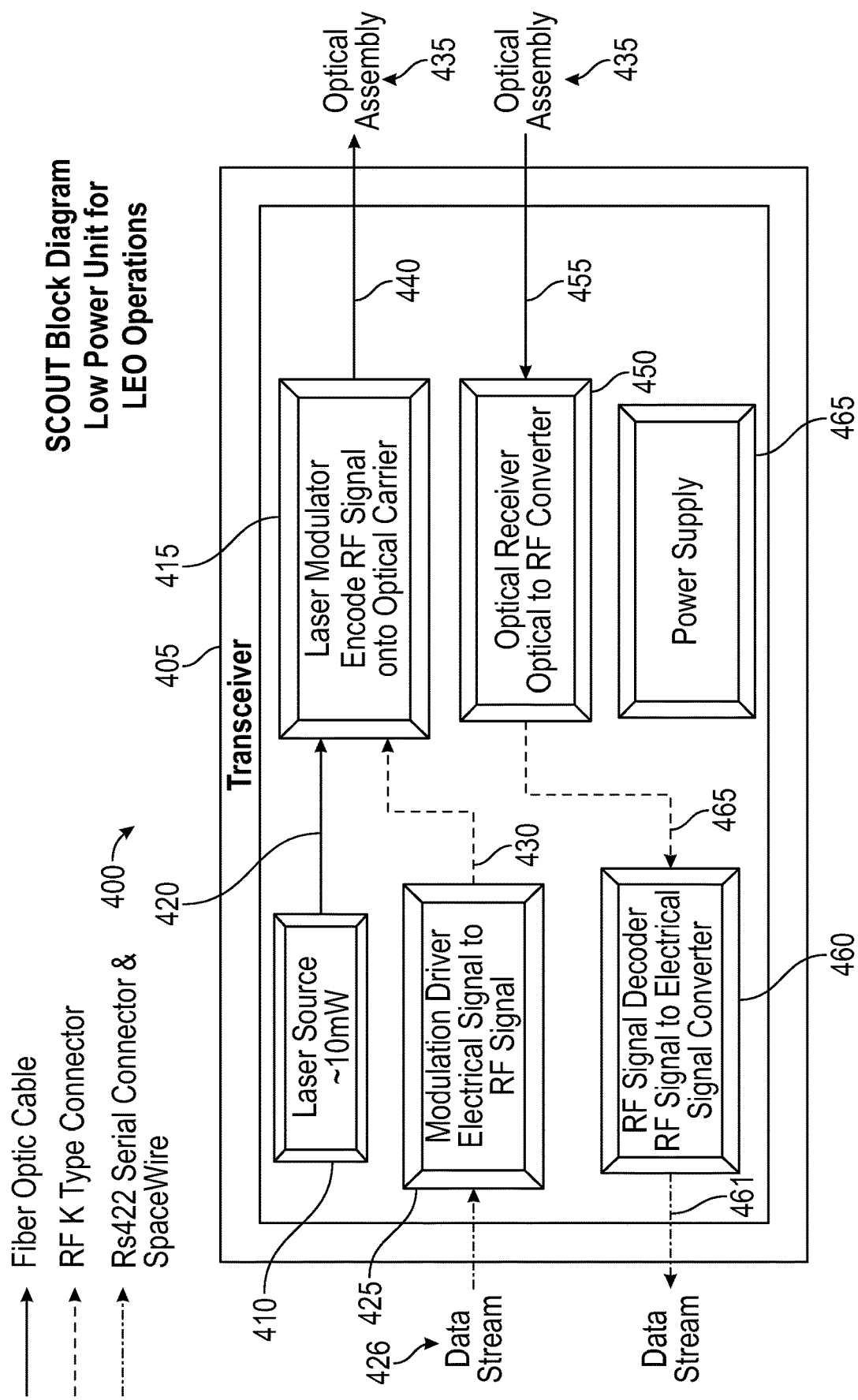
FIG. 4 depicts a block diagram of a low power transceiver unit in accordance with the disclosed embodiments.

For example, FIG. 4 illustrates a system diagram of a low power unit 400, which can be used for operations in LEO (or other low power applications). The system 400 includes a transceiver 405. The transceiver 405 comprises a laser source 410 optically connected to a laser modulator 415. In certain embodiment, the optical connection 420 can comprise a fiber optic cable, but other optical connections might also be used. The laser modulator 415 is driven by a modulation driver 425. The modulation driver accepts input data 426, and converts the electrical input signal into an RF signal. The RF signal can be delivered to the laser modulator 415 via a connector 430, such as an RF K-type connector, or other such connector. The laser modulator 415 encodes the RF signal from the modulation driver 425 onto the optical carrier (i.e., the laser from laser source 410), and provides the modulated signal 440 to an optical assembly 435. Again, the modulated signal 440 can be provided via a fiber optic cable, or other such optical connection.

The transceiver 405 also includes an optical receiver 450 that can receive an optical signal from the optical assembly 435. The incoming signal 455 can be provided via fiber optical cable or other such optical connection. The optical receiver 450 serves to strip the RF signal from the optical signal. The RF signal can be sent to an RF signal decoder 460, again via a connector 465, that can comprise an RF K-type connector, or other such connector. The RF signal decoder 460 converts the RF signal to an electric signal which can be embodied as output data 461. The data streams 426 and/or 461 can be provided via a RS422 Serial connector and space wire, or other such configuration.

The in certain embodiments, a wavelength source for the optical transmitter comprises a single wavelength source. In other embodiments the source is composed of multiple laser oscillators that are combined using wavelength division multiplexing. The optical system embodiments disclosed herein can have a primary mirror spectral response that is robust to these variations in wavelength. The baseline design assumes optical downlink performance configurable between 100 Mbps to 200 Gbps.

Figure 5:
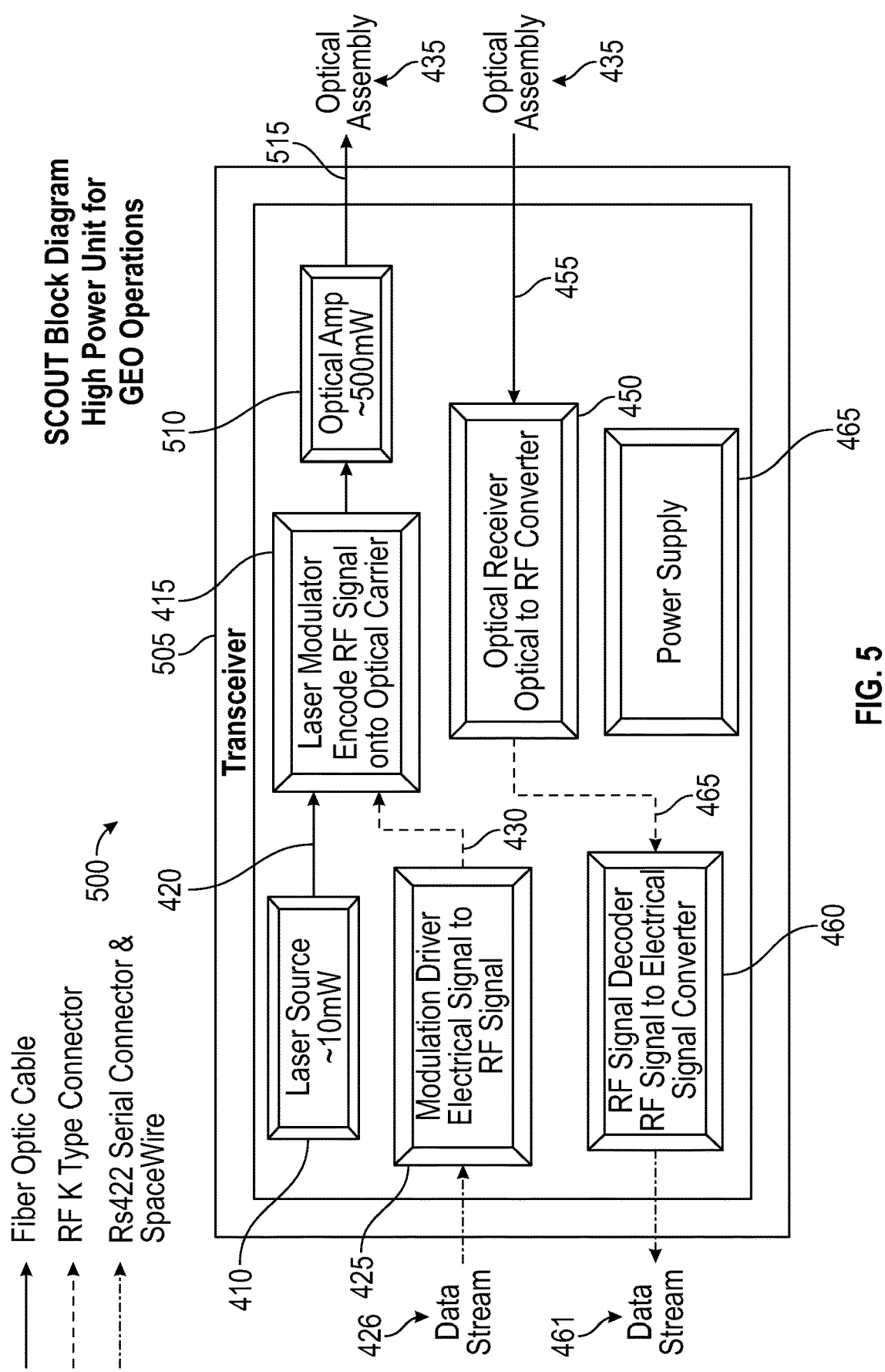
FIG. 5 depicts a block diagram of a high power transceiver unit, in accordance with the disclosed embodiments.

Similarly, FIG. 5 illustrates a system diagram of a high power unit 500, which could be used for operations in geosynchronous orbit, or for other such high power applications. The system 500 includes a transceiver 505. The transceiver 505 comprises many parts equivalent to those in the lower power unit 400. Like parts are referenced with like reference numerals. For example, the transceiver 505 includes a laser source 410 optically connected to a laser modulator 415. In certain embodiment, the optical connection 420 can comprise a fiber optic cable, but other optical connections might also be used. The laser modulator 415 is driven by a modulation driver 425. The modulation driver accepts input data 426, and converts the electrical input signal into an RF signal. The RF signal can be delivered to the laser modulator 415 via a connector 430, such as an RF K-type connector, or other such connector. The laser modulator encodes the RF signal from the modulation driver 425 onto the optical carrier (i.e., the laser from laser source 410).

In the high power unit 500, the laser modulator 415 provides an output (e.g., an optical signal on a fiber optical cable) to an optical amplifier 510, which amplifies the signal (for high power applications) and provides the modulated and amplified signal 515 to an optical assembly 435. Again, the modulated signal 440 can be provided via a fiber optic cable, or other such optical connection.

As in the low power unit 400, the transceiver 505 in the high power unit 500 also includes an optical receiver 450 that can receive an optical signal from the optical assembly 435. The incoming signal 455 can be provided via fiber optical cable or other such optical connection. The optical receiver 450 serves to convert the optical signal to an RF signal. The RF signal can be sent to an RF signal decoder 460 again via a connector 465, that can comprise an RF K-type connector, or other such connector. The RF signal decoder 460 converts the RF signal to an electric signal which can be embodied as output data 461.

It should be further noted that, in other embodiments, transceivers having standard packages (for example, GBIC, SFP, SFP+, Xenpak, X2, XFP, CFP, CFP2, CFP4, QSFP28, etc.) can be used for either multimode fiber or single mode fiber communication links. For example, SFP+—ZR C-band transceivers are intended for use with single mode fiber. In certain embodiments, the SFP+—ZR C-band transceiver, for example, can be used with very little loss penalty with a 50 micron core multimode optical fiber. This may provide optical telescope receiver design tolerance advantages and lower pointing precision requirements. The multimode receiver communication performance is less sensitive to mechanical alignment, thermal distortion and overall temperature changes.

Likewise, in certain embodiments a larger core (e.g., 50 micron diameter) multimode fiber optic amplifier can be used to improve receiver sensitivity and facilitate advantages of the multimode receiver.

Figure 6:
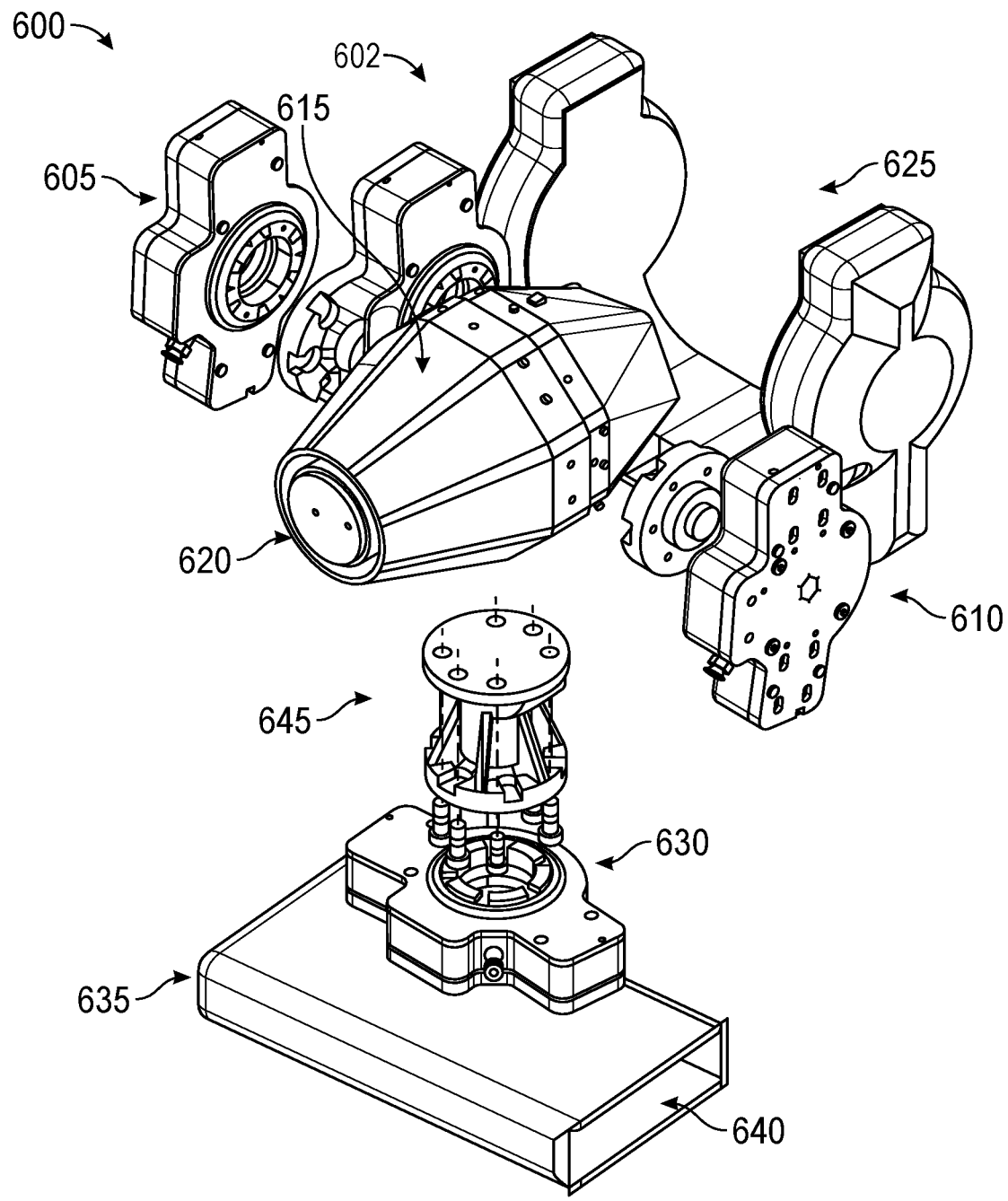
FIG. 6 depicts a schematic diagram of an optical communication terminal, in accordance with the disclosed embodiments.

FIG. 6 illustrates an exemplary, optical communications terminal 600, in accordance with the disclosed embodiment. It should be noted that aspects of the elements illustrated in FIGS. 4 and 5 can be incorporated in, or operate with, the optical communications terminal 600. The optical communications terminal 600 can include a pointing and tracking system 602 which generally includes two ultrasonic piezoelectric rotary stages 605 operably connected to a telescope shroud 615. The telescope shroud houses a telescope 620 therein. The shroud can further be fitted with an elevation gimbal 625 used to adjust the elevation of the shroud 615 and associated telescope 620. Likewise, the terminal 600 can include an azimuth gimbal 645 configured to control the azimuth of the shroud 615 and associated telescope 620.

The terminal 600 can further include a base ultrasonic piezoelectric rotary stage 630 fitted to a base housing 635. A modem 640 can be housed in the base housing 635 and can include communication lines configured to accept input to control the attitude of the telescope 620 via the rotary stages and gimbals.

In certain embodiments, piezoelectric ultrasonic motors with high torque at low rotational speed, and microradian precision can be used for the disclosed gimbal motors. Such motors have a high holding torque even if no power is applied. Compared to electromagnetic actuators, the torque per volume ratio of piezoelectric ultrasonic motors can be higher by an order of magnitude. In certain embodiments, the piezoelectric ultrasonic motors can be selected to operate in ultra-high vacuum environments with high operational lifetime.

Figure 7:
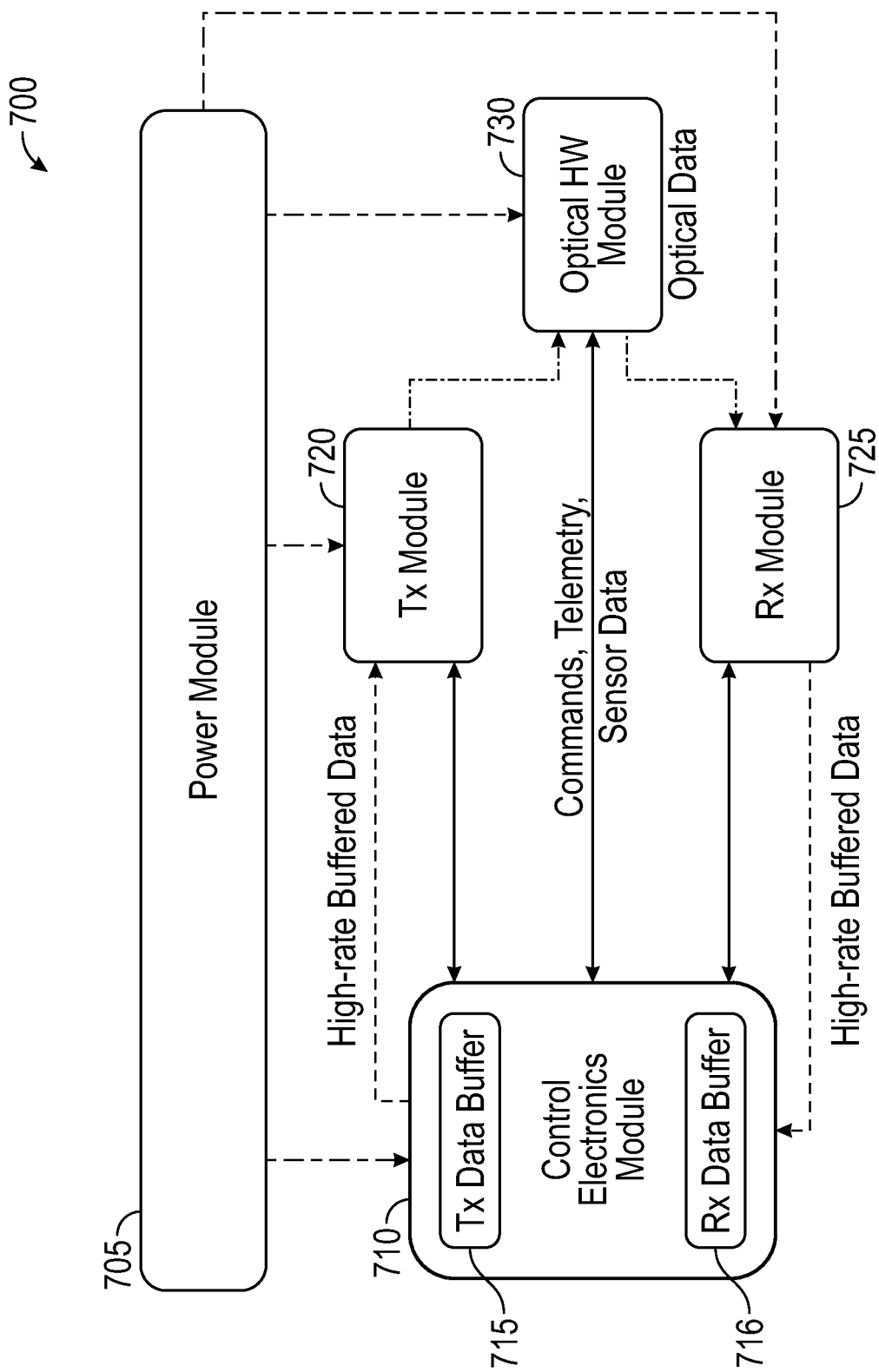
FIG. 7 depicts a block diagram of a system for transmitting data, in accordance with the disclosed embodiments.

FIG. 7 illustrates a block diagram of a software configurable optical universal transceiver system 700, in accordance with aspects of the disclosed embodiments.

In certain embodiments, a standard transceiver, which may be known in the art as a "grey transceiver" can be used. A standard transceiver is a single channel device and can be connected directly to a single fiber channel or ethernet data switch in order to send data. A standard transceiver can also be used as an optical interface in certain transponder type systems.

FIG. 7 illustrates an exemplary embodiment of a transceiver in accordance with the disclosed embodiments. However, it should be appreciated that in other embodiments, other transceiver modules can also be used without departing from the scope of the disclosed embodiments.

The system 700 can include a power module 705 that supplies power to a control electronics module 710. It should be appreciated that the control electronics module 710 can comprise hardware or software or some combination thereof. The control electronics module 710 shares commands, telemetry, and sensor data with an optical hw module 730.

The control electronics module 710 includes a Transmit "Tx" data buffer 715 and an Receive "Rx" data buffer 716. The Tx module 720 and Rx module 725 are both powered by power supply 705.

Buffered data from the Tx data buffer 715 can be provided to a Tx module 720. Output from the Tx module can be provided to an optical HW module 730. The optical HW module 730 is also powered by power module 705.

Output from the optical HW module 730 is then provided to the Rx Module. High-rate buffered data can be provided from the Rx Module to the Rx Data buffer 716 associated with the control electronics module 710.

Figure 8:
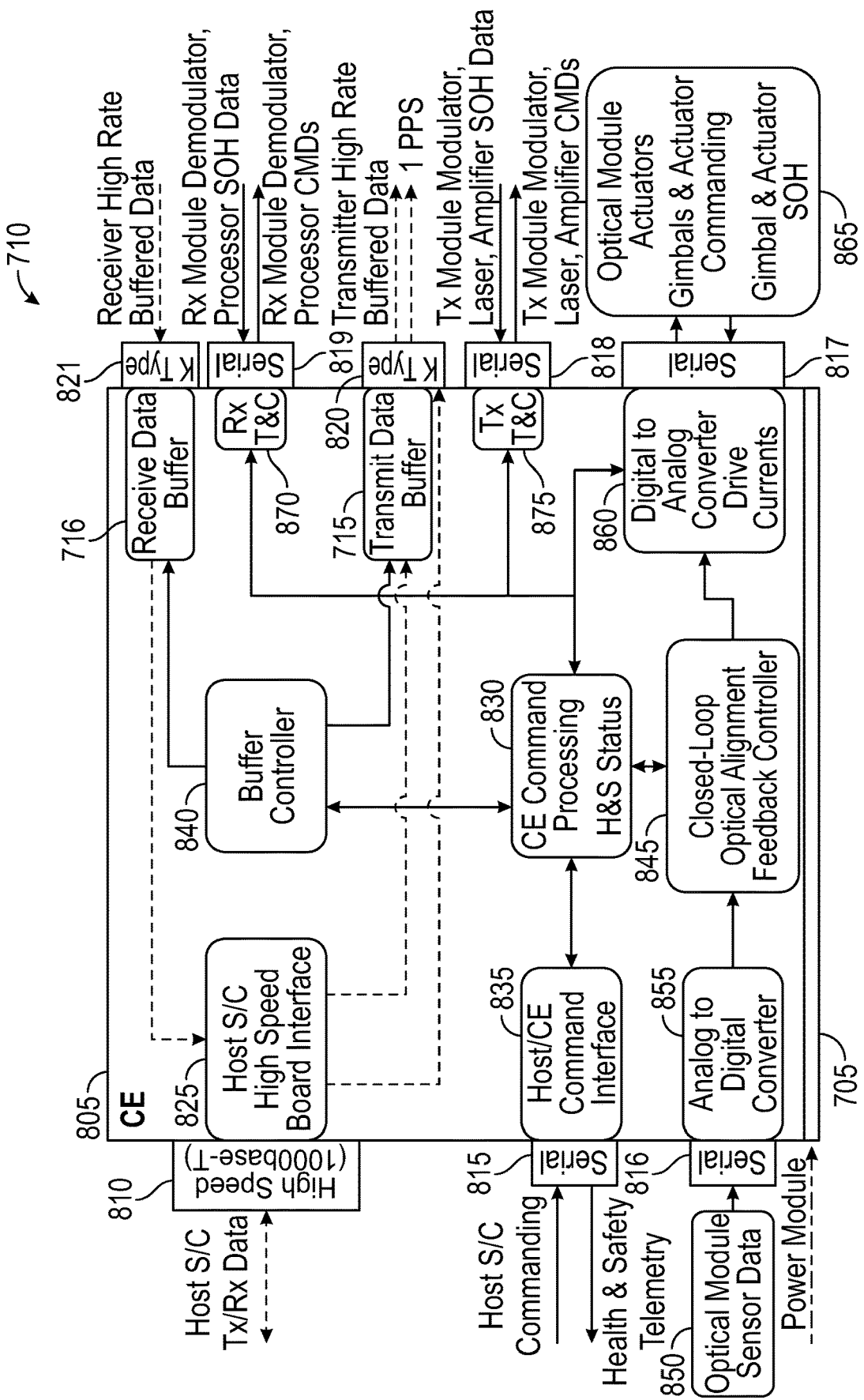
FIG. 8 depicts a computer electronics module, in accordance with the disclosed embodiments.

FIG. 8 illustrates a block diagram of the computer electronics module 710 in accordance with the disclosed embodiments. The computer electronics module can comprise a combination of hardware and software configured to provide and process control commands, telemetry data, and sensor data.

The computer electronics module 710 can comprise a board 805. The board 805 can include a high speed port 810, serial ports 815, 816, 817, 818, and 819, and K type ports 820 and 821. Power can be supplied to the board 805 via power module 705

The high speed port 810 can be connected to a Host S/C high speed board interface 825. The high speed port 810 can serve as the interface for Host S/C transmission and reception data, which is provided to the Host S/C high speed board interface 825. The Host S/C high speed board interface 825 can provide transmit data to the transmit data buffer 715 which can be connected to K-type port 820. The Host S/C high speed board interface 825 can also provide data directly to the K-type port 820. The Host S/C high speed board interface 825 can also receive data incoming at K-type port 821, from the receive data buffer 716.

A control electronics command processing and H&S status unit 830 can be used to control various aspects of the system 700. The control electronics command processing and H&S status unit 830 can receive input and send output via the Host/CE Command interface 835, which is connected to serial port 815. The serial port 815 can receive Host S/C command instructions and can output health and safety telemetry data.

The control electronics command processing and H&S status unit 830 can control various aspects of the control electronics module 710. For example, a buffer control 840 that is used to control the receive data buffer 716 and the transmit data buffer 715 can be controlled via the control electronics command processing and H&S status unit 830.

The control electronics command processing and H&S status unit 830 can further be connected to a closed loop optical alignment feedback controller 845 which can be used for alignment of, for example, the optical terminal 600. Optical module sensor data 850, provided by an optical module sensor, can be provided to the control electronics module 710 via serial port 816. The serial port 816 is connected to an analog to digital converter 855, which provides a digital signal to the closed loop optical alignment feedback controller 845. The closed loop optical alignment feedback controller 845 and control electronics command processing and H&S status unit 830 uses the sensor data to determine adjustments required for the optical module. The closed loop optical alignment feedback controller 845 sends control commands to digital to analog converter 860, which converts the digital control commands to an analog signal and sends them to optical actuators module 865, via serial port 817. The optical actuators module 865 can receive commands that include instructions for controlling actuators associated with the ultrasonic piezoelectric rotary stages, gimbals and other controls, and send gimbal and actuator state of health (SOH). The control electronics command processing and H&S status unit 830 can also communicate with the digital to analog converter 860 directly to send/receive data from the optical actuators module 865.

The data passing between the control electronics command processing and H&S status unit 830 and the optical actuator module 865 can also be provided to the receiving telemetry and control module 870 and the transmission telemetry and control module 875, which are connected to serial port 819 and serial port 818 respectively. The receiving T&C module 870 can send and receive data to and from a receive module demodulator that processes SOH data, and processes commands. The transmission T&C module 875 sends and receives data from the transmission module modulator, the data including laser and amplifier SOH data, and laser and amplifier commands.

Figure 9:
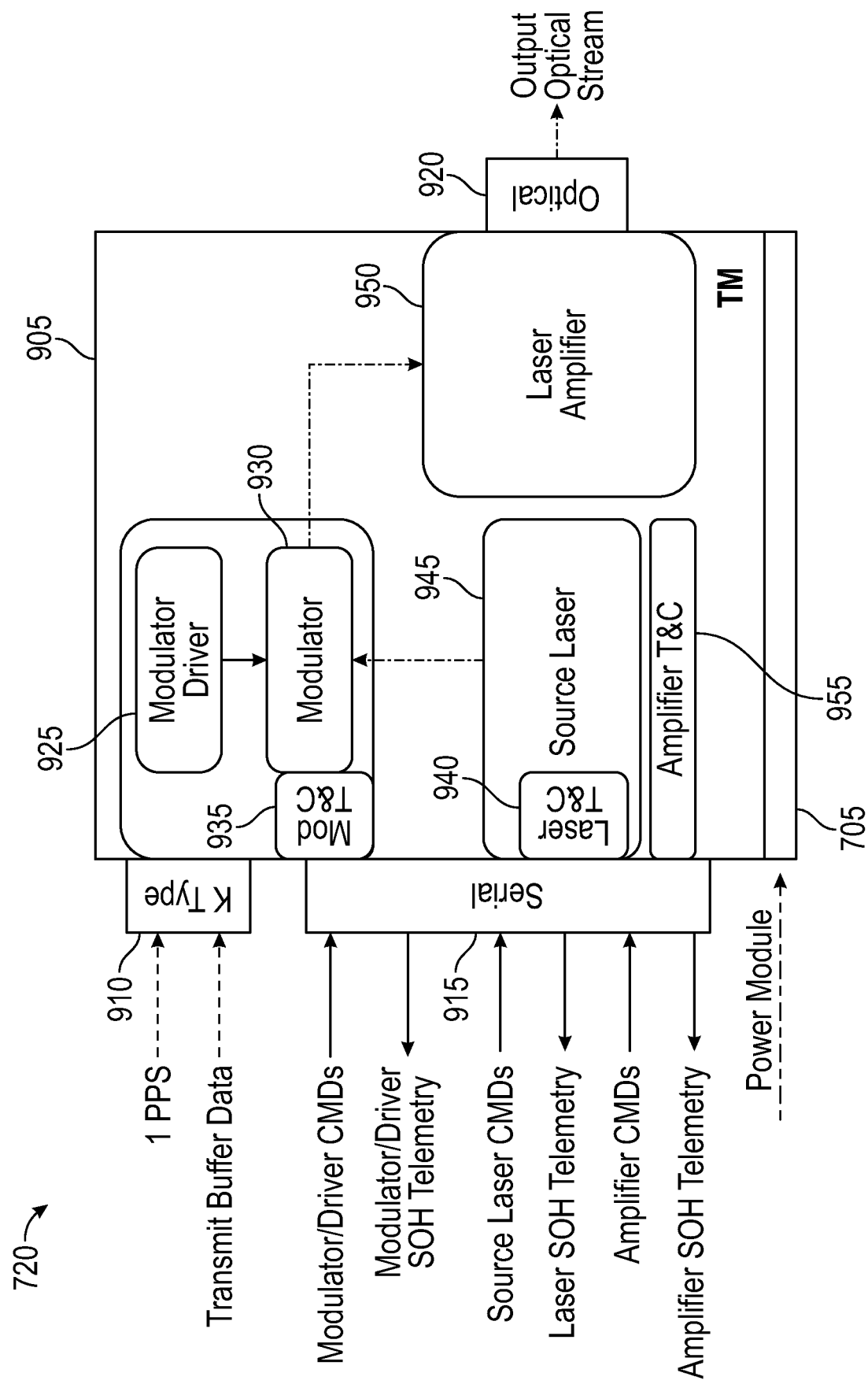
FIG. 9 depicts a transmitter module, in accordance with the disclosed embodiments.

FIG. 9 illustrates an exemplary transmit module 720 in accordance with the disclosed embodiments. The transmit module 720 is used to transmit the optical stream of data. The transmit module 720 can comprise a board 905 powered by the power module 705. The board includes a variety of ports, including K-type port 910, serial port 915, and optical output 920.

The transmit module 720 comprises a modulator driver 925 that drives modulator 930. Transmit buffer data is provided via the K-type connection 910. The modulator 930 is connected to modulator telemetry and control 935, which receives modulator and driver commands via the serial port 915, and transmits modulator/driver SOH telemetry.

A laser telemetry and control 940 is also connected to a laser source 945, that provides the laser input to the modulator 930. The laser telemetry and control 940 receives source laser commands via serial port 915, and transmits laser SOH telemetry via serial port 915.

The modulated laser can be provided to laser amplifier 950, which outputs the desired optical stream. The laser amplifier can be connected to the serial port 915 via the amplifier telemetry and control 955. The laser amplifier receives amplifier commands and transmits amplifier SOH telemetry data.

Figure 10:
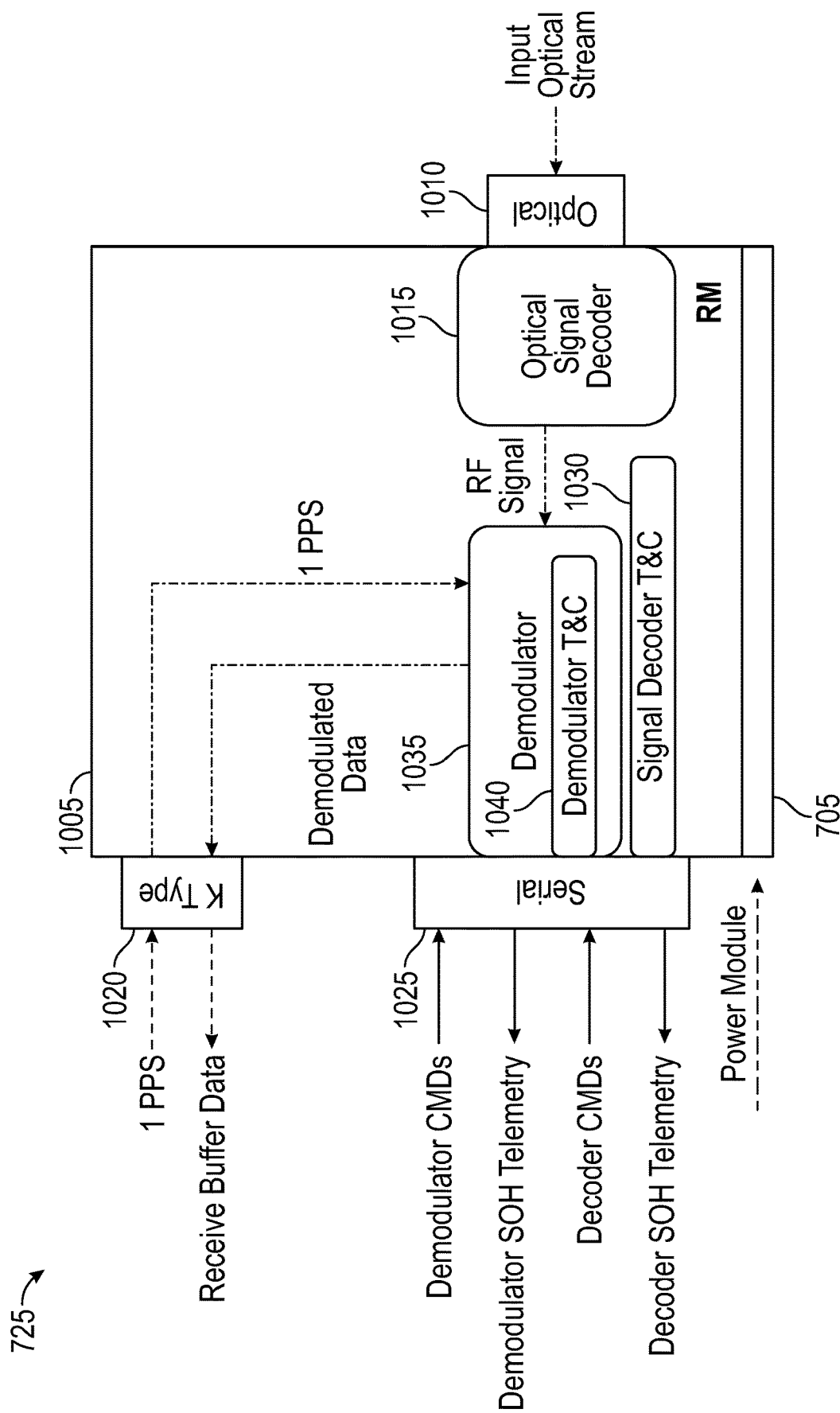
FIG. 10 depicts a receiver module, in accordance with the disclosed embodiments.

FIG. 10 illustrates an exemplary receiving module 720 in accordance with the disclosed embodiments. The receiving module 725 is used to receive the input optical stream of data. The receive module 725 can comprise a board 1005 power by the power module 705. The board includes a variety of ports, including K-type port 1020, serial port 1025, and optical input 1010.

The input optical stream can be collected at the optical port 1010, where it is sent to an optical signal decoder 1015. The optical signal decoder can be sent decoder commands and can transmit decoder SOH telemetry via signal decoder telemetry and control 1030 connected to serial port 1025.

The optical signal decoder 1015 converts the optical input into an RF signal that is provided to a demodulator 1035. The demodulator receives demodulation commands and sends demodulator SOH telemetry via demodulator telemetry and control 1040. The demodulated data can be sent to the receive buffer via the k-type connector 1020.

Figure 11:
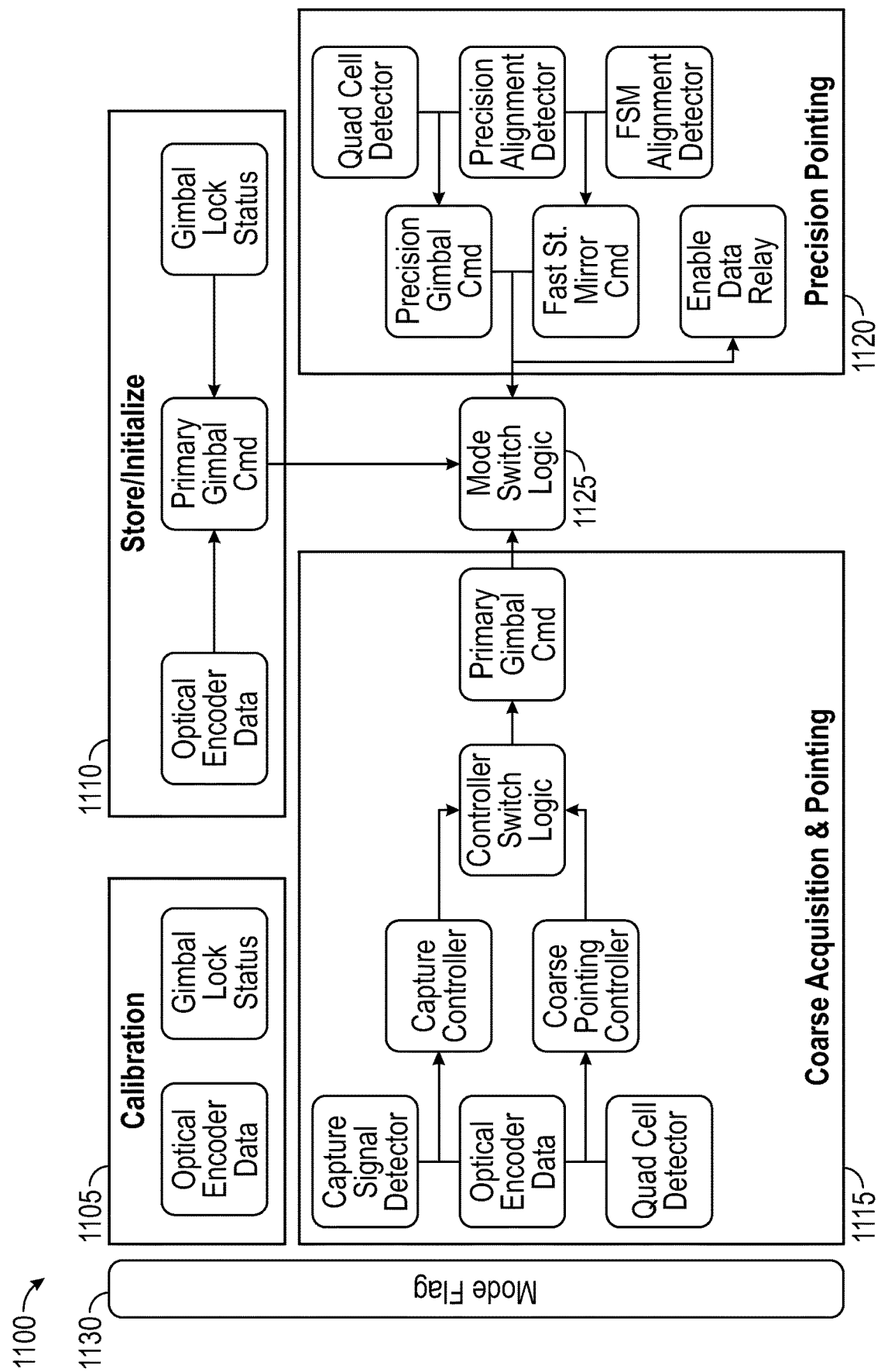
FIG. 11 depicts a pointing method, in accordance with the disclosed embodiments.

A key aspect of long range laser communication is to ensure the optical signal is pointed at its target. FIG. 11 illustrates a flow chart of steps 1100 associate with optical pointing operations in accordance with the disclosed embodiments. The flow generally illustrates the process from calibration at step 1105, to a storing and initialization at step 1110, which can then proceed to coarse acquisition and pointing at step 1115, and finally to precision pointing at step 1120. These steps can be realized using the system described herein. It should be appreciated that mode switches can be autonomous, based on gimbal and FSM commands as detailed herein.

At initial calibration at step 1105 optical encoder data is used, and gimbal lock status can be reviewed.

Once the initial calibration is complete, store/initialization operations begin at step 1110. At this step, optical encoder data and gimbal status data can be provided to the primary gimbal command. The primary gimbal command provides information to mode switch logic 1125.

Coarse acquisition and pointing can be completed at step 1115. Coarse acquisition and pointing makes use of a capture signal detector, optical encoder, and quad cell detector. These three elements are connected to the capture controller and coarse pointing controller. The capture controller and coarse pointing detector provide input to a controller switch logic that uses the input. The controller switch logic provides input to the primary gimbal command, which can in turn provide input to the mode switch logic 1125. At this step a capture controller can spiral a gimbal space search if no signal is observed. The transition to coarse pointing begins for a near centered signal.

Precision pointing at step 1120, uses a quad cell detector, precision alignment detector and FSM alignment detector data to provide input to the precision gimbal command and fast st. mirror command. The commands can be input to the mode switch logic 1120, and can enable the data relay. In the precision pointing stage a secondary optical head provides the precision alignment data. The precision gimbal and FSM are then used to hold the optimal pointing for data transmission/reception. Mode Flag 1130 is provided.

Figure 12:
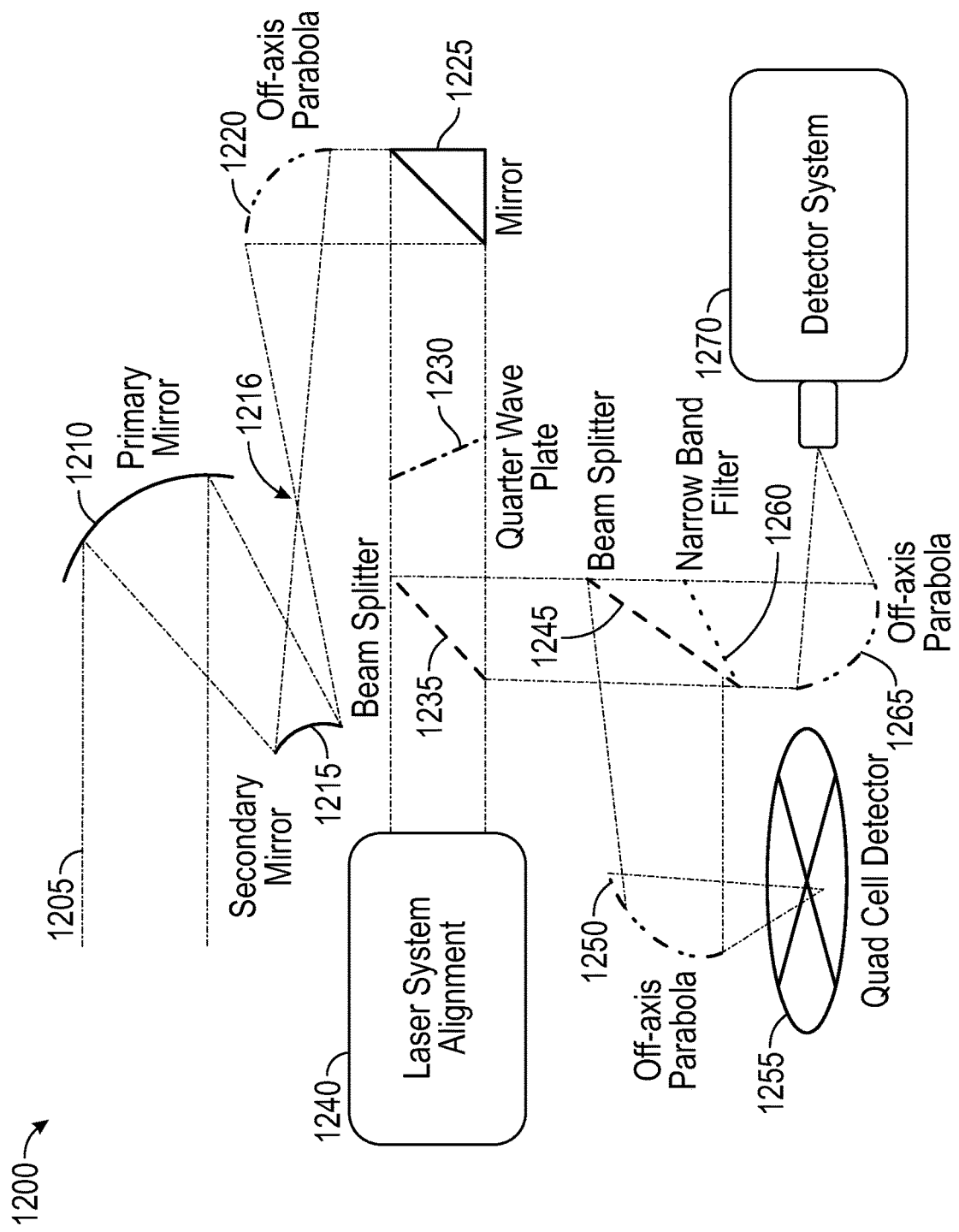
FIG. 12 depicts an optical system, in accordance with the disclosed embodiments.

An optical system 1200 associated with the transmission of data in accordance with the disclosed embodiments, is illustrated in FIG. 12. It should be appreciated that the system 1200 is exemplary and may be modified as required by certain design parameters.

In the exemplary embodiment of the system 1200 input signal 1205 is incident on primary mirror 1210. The primary mirror 1210 can comprise a mirror selected to reflect the input signal onto secondary mirror 1215. The secondary mirror 1215 reflects the input signal 1205 onto an off-axis parabola 1220 configured at a distance beyond the secondary mirror's focal length shown as optical path point 1216.

Off axis parabola 1220 directs the signal onto a third mirror 1225. The signal then passes through a quarter wave plate 1230, and then onto a beam splitter 1235. The beam splitter 1235 provides some of the input signal to the laser alignment system 1240 for optical pointing operations as illustrated in method 1100.

The remaining input signal 1205 is sent to a second beam splitter 1245. The second beam splitter 1245 provides some of the input beam to an off-axis parabola 1250, which focuses the input signal onto a quad cell detector 1255.

The other half of the input signal 1205 passes through a narrow band filter 1260, to an off-axis parabola 1265, that focuses the input signal onto the detector system 1270, where the data can be processed as described herein.

Figure 13:
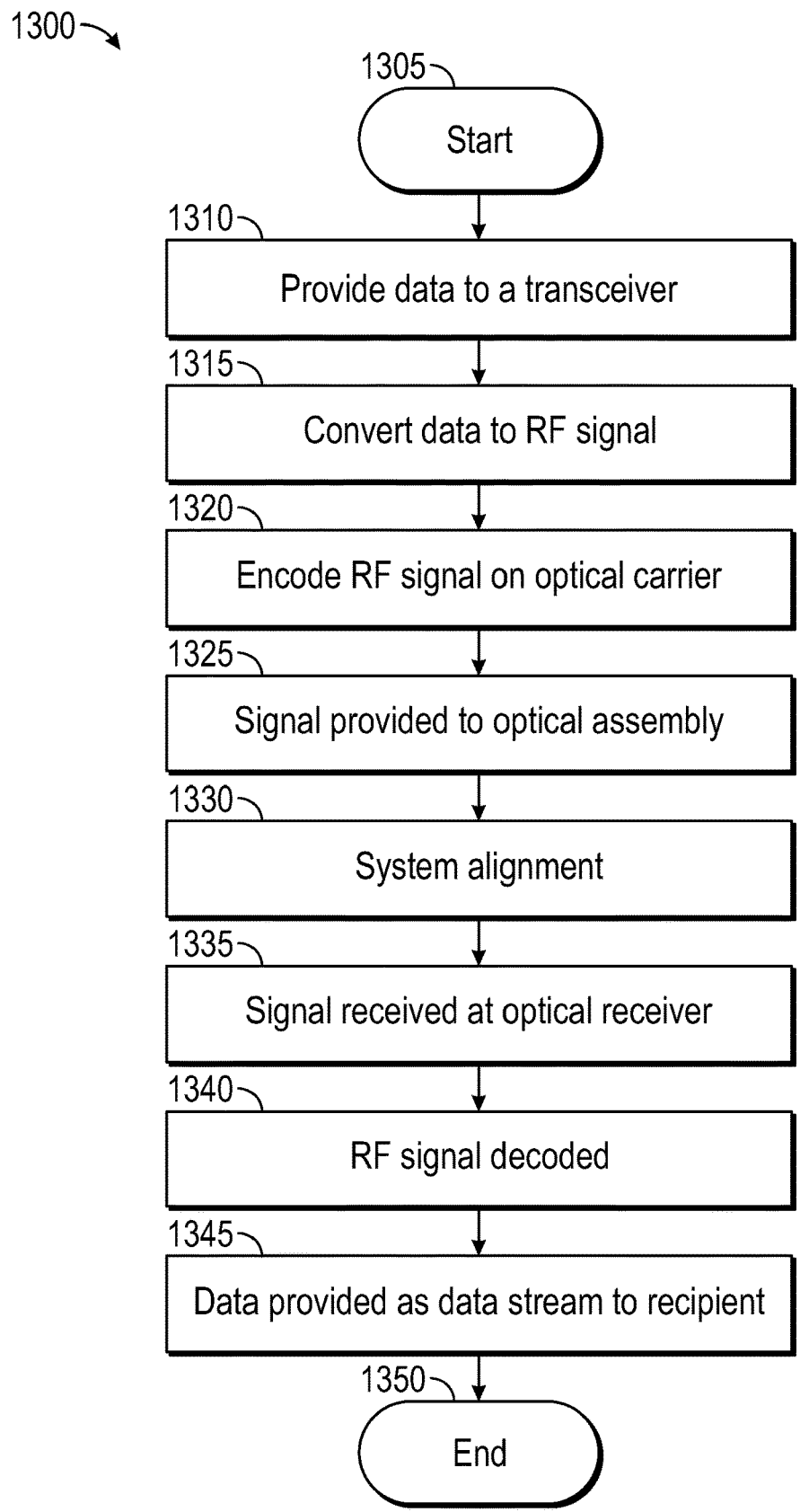
FIG. 13 depicts a flow chart depicting a method for data transmission, in accordance with the disclosed embodiments.

FIG. 13 illustrates a flow chart of steps associated with a method 1300 for optical data transmission in accordance with the disclosed embodiments. It should be appreciated that the method 1300 can be accomplished using various systems and method described herein. The method begins at 1305.

At step 1310 data that a user desires to transmit, can be provided as an electrical signal to a transceiver as disclosed herein. At step 1315, the data can be converted to an RF signal. The RF signal can then be provided to a laser modulator, where the RF signal can be encoded onto an optical signal provided by a laser source as illustrated at step 1320.

The optical signal can then be provided to an optical assembly as shown at step 1325. This can include providing the signal to a laser alignment system to ensure proper alignment of the system as illustrated at 1330. It should be understood that the alignment at step 1330 is, exemplary. Step 1330 can comprise some of all of the steps illustrated in FIG. 11 and can be conducted at other points in the method in other embodiments.

The optical signal is then received from the optical assembly at the optical receiver as shown at step 1335. The RF signal can then be decoded from the optical carrier signal at step 1340, and provided as a data stream to the recipient at step 1345. The method ends at 1350.

In another embodiment, an optical terminal for free-space communication is disclosed. The optical terminal provides a means to communicate and navigate over a range of distances (kilometers to megameters) using information impressed on an optical carrier that propagates in free space. Such embodiments are illustrated, for example in FIGS. 14-16.

Figure 14:
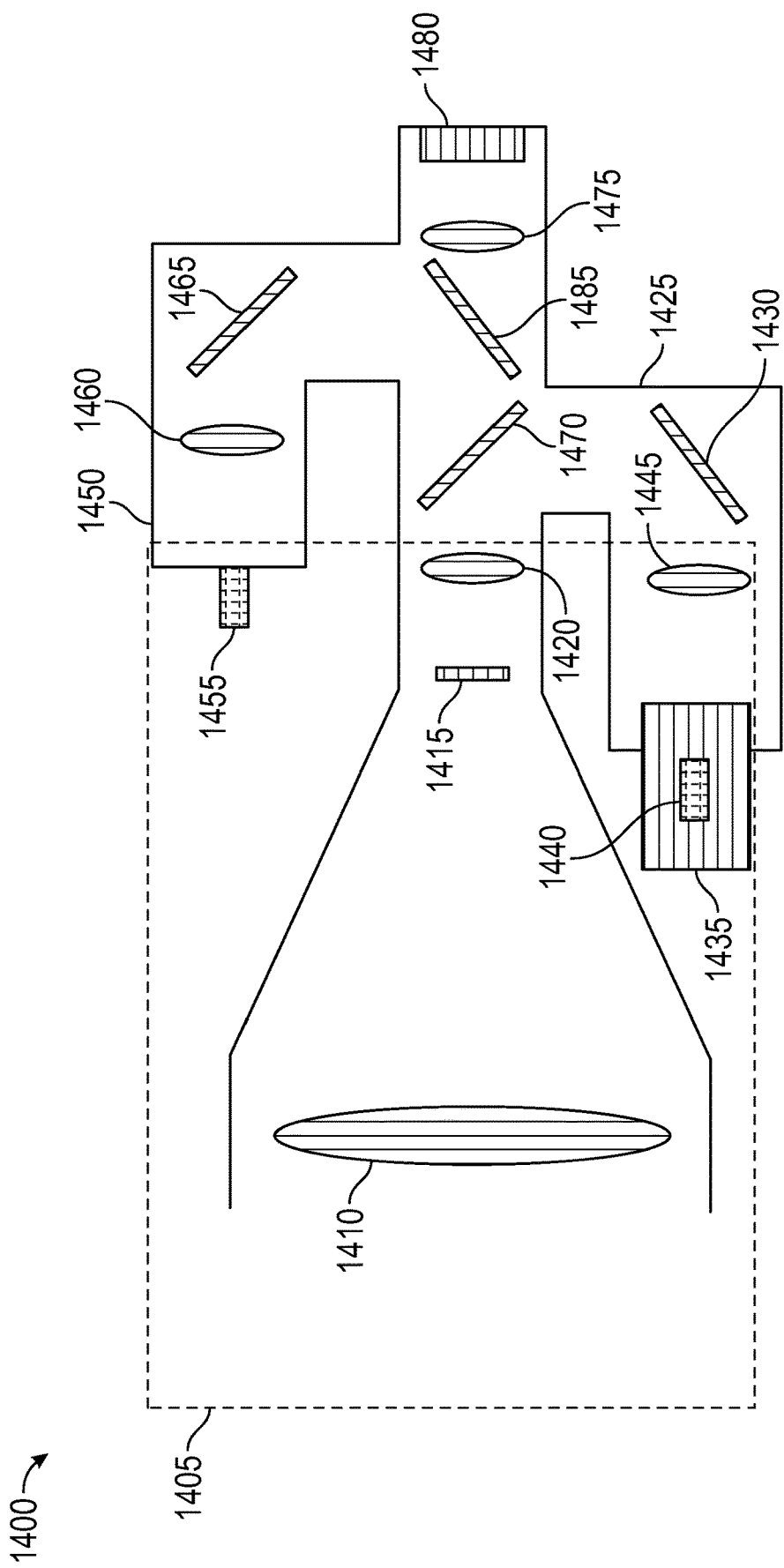
FIG. 14 depicts a schematic diagram of backend optics in an optical terminal, in accordance with the disclosed embodiments.

FIG. 14 illustrates an telescope 1400 and associated backend optics for an optical communications terminal in accordance with the disclosed embodiments. Aspects of the telescope 1400 can be used in other embodiments of systems and/or methods disclosed herein. The telescope 1400 can generally include a housing 1405 for an objective lens 1410. The objective lens can be connected to a field stop (pin hole) 1415 proximate to the eyepiece 1420.

The housing 1405 can further include an arm 1425 fitted with a mirror 1430 in the beam path of a fiber optic transmitter 1435 and associated piezoelectric transducer 1440 for collimation adjustment. A collimator 1445 can be configured between the fiber optic transmitter 1435 and the mirror 1430. The beam can be directed from the mirror to a thin film Dichroic filter 1470.

A second arm 1450 of the housing 1405 can comprise a fiberoptic receiver 1455 where beam is directed through a receiver focusing lens 1460 onto mirror 1465. The mirror 1465 can be fitted with a fast steering mirror actuator. Beam passing through the Dichroic filter 1470 and beam from the mirror 1465 are incident on partial reflecting mirror 1485, through blur lens 1475 and onto quad cell 1480.

An optical terminal for free-space communication is also disclosed. The optical terminal incorporates various components in order to provide optical transmission and reception quality to support communication and navigation over a range of distances (kilometers to megameters).

The optical terminal can comprise an optical telescope, such as telescope 1400 (or telescopes) for bidirectional communication and navigation, a pointing and tracking system for transmission and reception of narrow (typically <1 square-degree) optical beams, and a modem.

Optical terminals disclosed herein use either optical reflector or refractor telescopes. Reflector telescopes have high-quality mirror element(s) with tight requirements on the mirror surface quality (e.g., <lambda/50, where lambda is the optical carrier wavelength) to minimize the optical wave front error (WFE). Refractor telescopes use multiple lens elements to achieve high wavefront flatness (e.g., <lambda/50, where lambda is the optical carrier wavelength) to minimize wave-front-error. In certain embodiments, aspheric lenses can be used to minimize the number of required refractive optical elements.

For a reflective telescope, the mirror can be constructed from a high thermal conductivity material to reduce thermal deformations that distort the optical wave front quality. In the disclosed embodiments, the combination of such technologies provides a high optical wave front quality in environments with external sources of thermal gradients (e.g., solar radiation).

In other embodiments, where the system can comprise a refractive telescope with optical elements (e.g., lenses), high tensile modulus and high thermal conductivity composites or metals can be used for the telescope housing 1405 and shroud construction.

Figure 15:
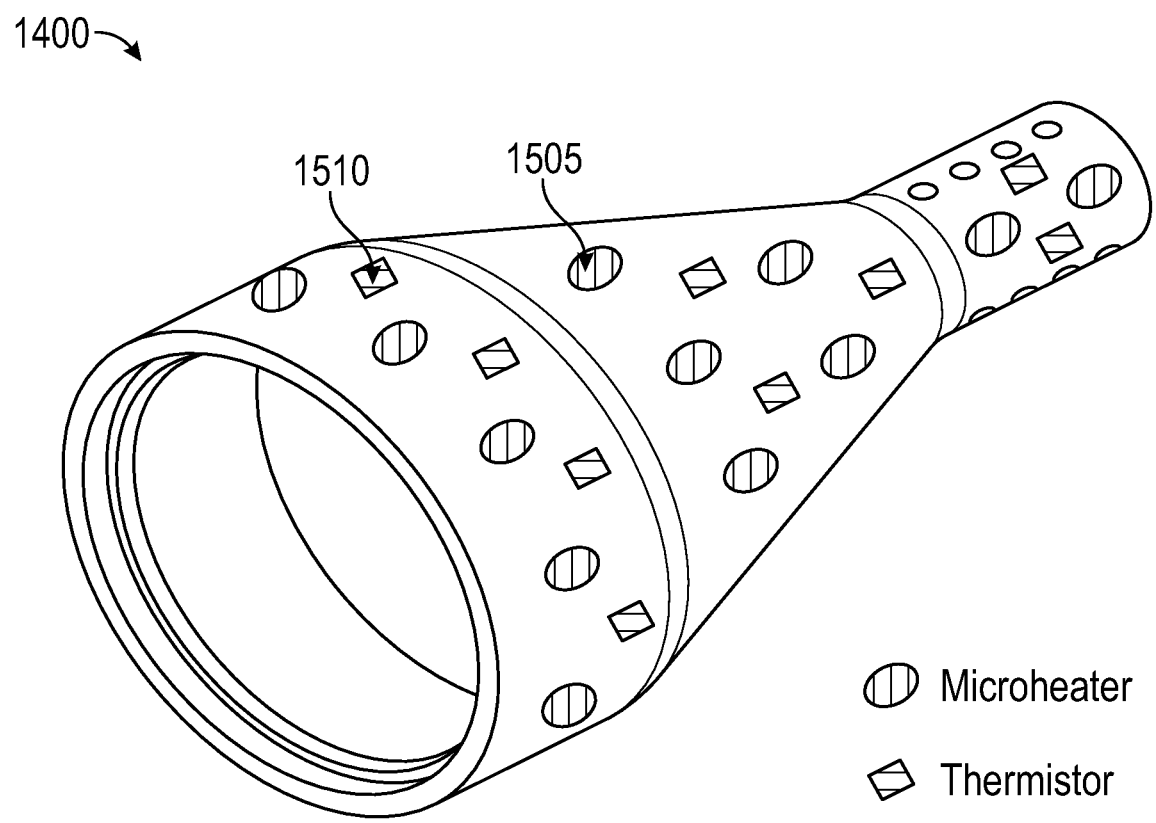
FIG. 15 depicts a schematic diagram of an optical communication terminal telescope with arrays of microheaters and thermistors, in accordance with the disclosed embodiments.

FIG. 15, illustrates housing 1405 of telescope 1400. As illustrated, a plurality of microheaters 1505 and thermistors 1510, can be integrated in the housing 1405. The array of microheaters 1505 and thermistors 1510 can be connected and controlled with a control loop algorithm to minimize thermal gradients. A high thermal conductivity material or coating on the telescope housing 1405 is provided. Likewise, a gimbal and shroud are provided to minimize thermal gradients.

In certain embodiments, paints or coatings engineered to minimize the thermal gradients on the gimbal, shroud, and telescope body can be used. Actuators (e.g., piezoelectric transducers) are provided to control the transmitter optical beam collimation and pointing and the receiver optical beam pointing and focusing to maximize fiber coupling efficiency. A multimode optical fiber receiver and multimode fiber optic amplifier are provided to maximize receiver optical coupling efficiency and reduce the sensitivity to receiver optical beam misalignment and defocusing. The system further includes an optical system for transmitter collimation measurement.

The main components of temperature control loops, as disclosed herein, include spatially distributed temperature heaters, controllers, and spatially distributed temperature sensors (such as thermistors 1510 or thermocouples). In some circumstances, the system parameters and working conditions might not be known accurately, or the system parameters may be dependent on the working conditions (temperature). System identification is a data-driven control algorithm approach that is based on estimating the model from experimental or collected data. The system identification control method optimizes microheater array control loops to minimize thermal gradients and required electrical power.

A single refractive optical telescope can used for both transmit and receive functions. A Keplerian design can provide an aperture stop 1415 at the focal point of the objective lens 1410 to eliminate solar background and stray light. Aspheric lenses provide low-aberrations resulting in high wavefront quality at low-cost. Thermal deformation and temperature-induced refractive index changes can be controlled using an emissive coating with high thermal conductivity and a low coefficient of thermal expansion. Such materials can be used for opto-mechanical structures, temperature control loops and piezo-electric auto-focus and auto-collimation control loops.

Figure 16:
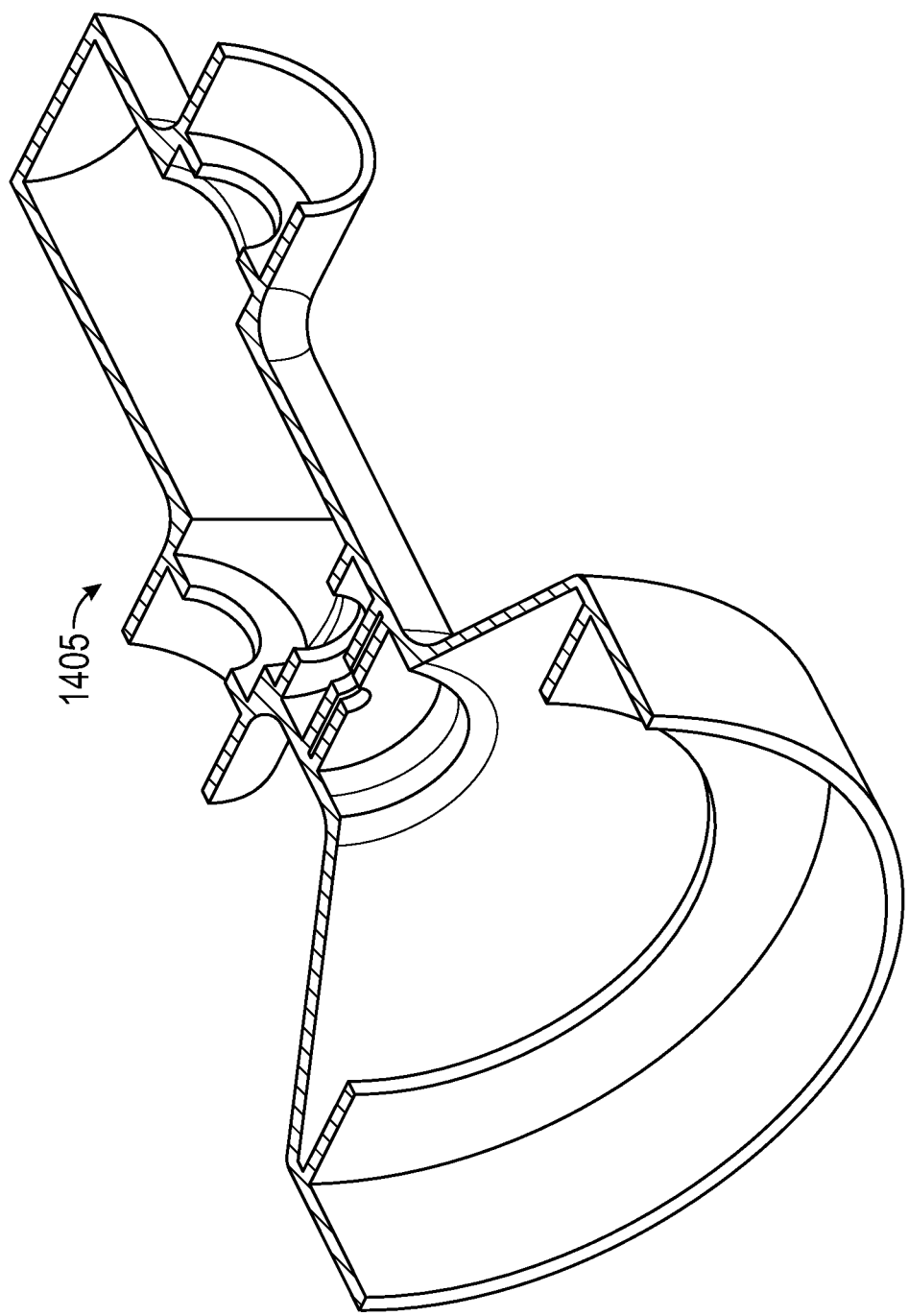
FIG. 16 depicts a view of a telescope housing, in accordance with the disclosed embodiments.

Furthermore, in certain embodiments, continuous carbon fiber mechanical and optomechanical structures can be used. Continuous carbon fiber has a high strength-to-weight ratio, high tensile modulus and a low coefficient of thermal expansion (CTE). The continuous carbon fiber structures can be manufactured using a resin with low outgassing and can comprise materials such as PEEK and ULTEM. A half of a telescope tube housing 1405 is illustrated in FIG. 16.

Figure 17:
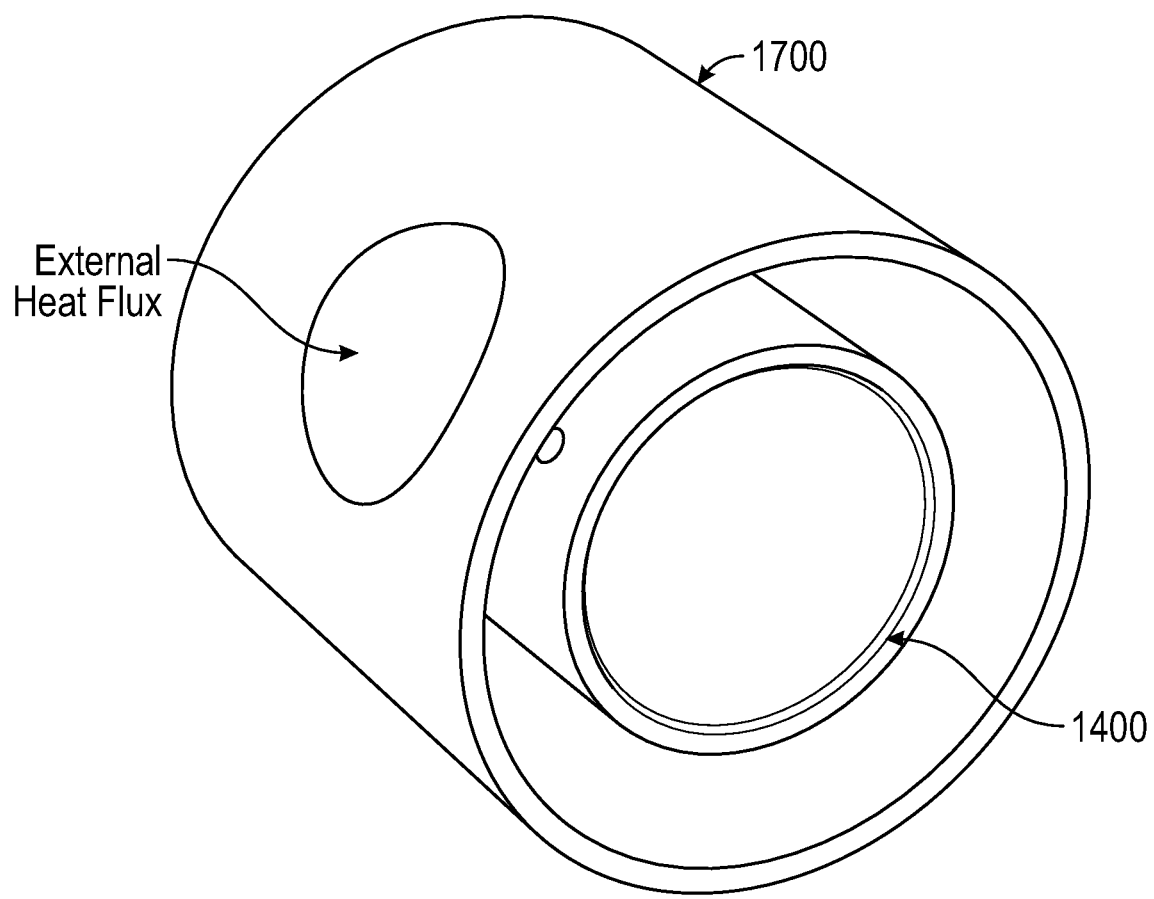
FIG. 17 depicts a telescope shroud, in accordance with the disclosed embodiments.

As illustrated in FIG. 17, a cylindrical (or other shaped) outer shell or "shroud" 1700 can be used to eliminate direct solar radiation on the telescope body and to reduce thermal gradients that distort the optical wavefront.

Figure 18A:
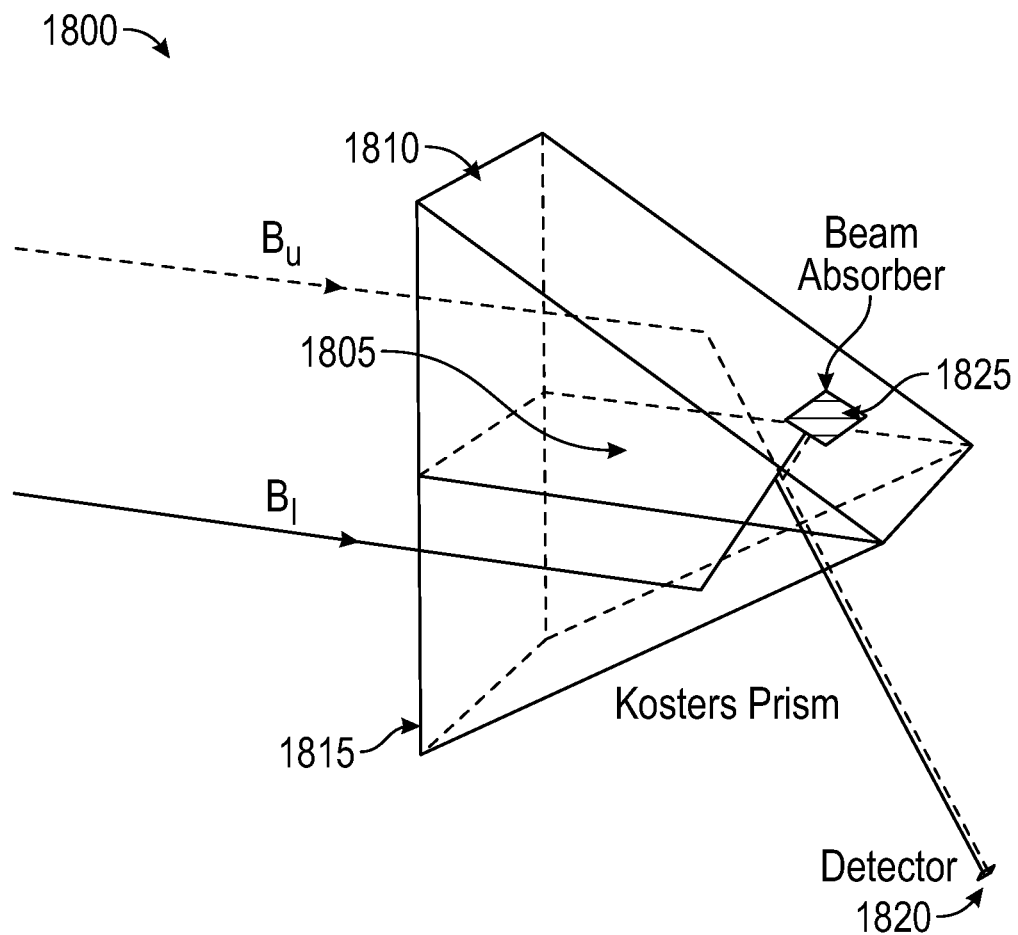
FIG. 18A depicts a schematic diagram of a Kosters prism associated with an optical communications terminal, in accordance with the disclosed embodiments.
Figure 18B:
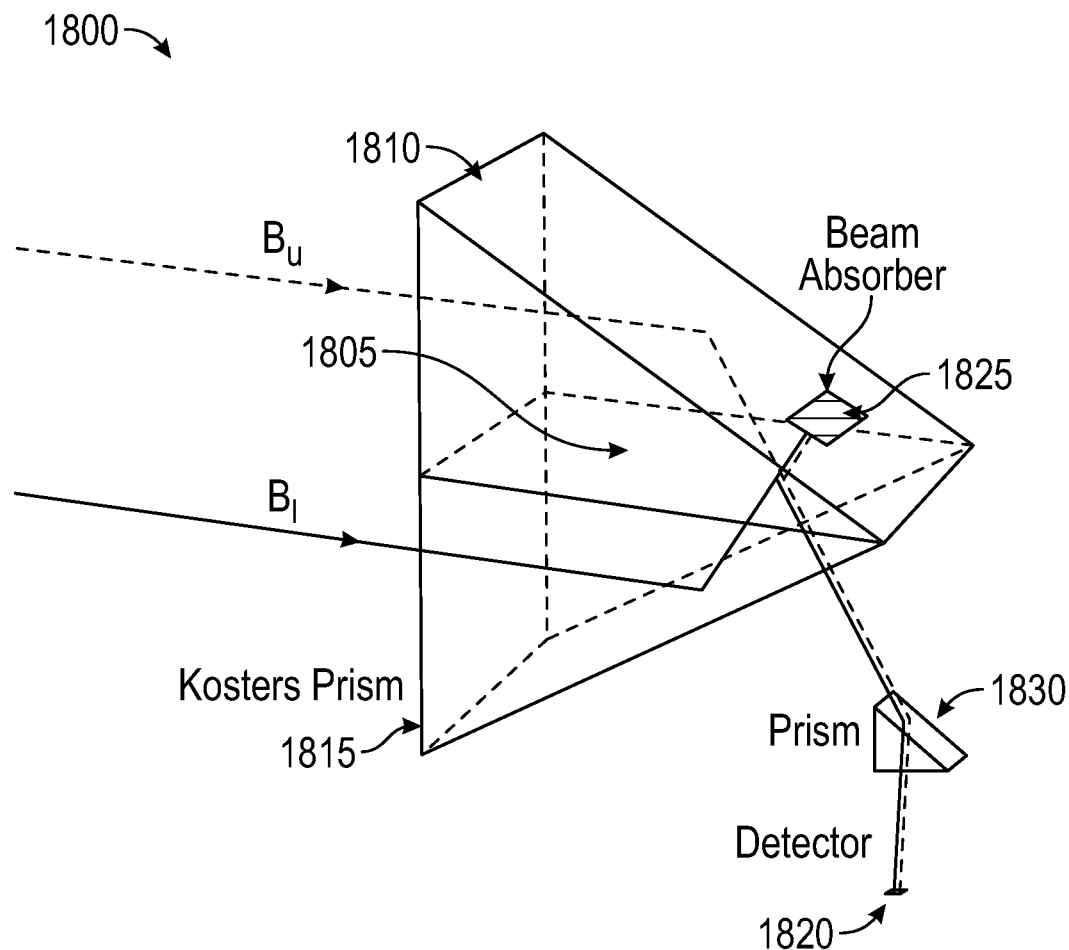
FIG. 18B depicts a schematic diagram of a Kosters prism associated with an optical communications terminal, in accordance with the disclosed embodiments.

The optical collimation measurement system can further use a Kosters prism system 1800 as illustrated in FIG. 18. In general, a light source from the left side (not shown) can provide a beam that propagates from left to right. The upper portion (Bu) and lower portion (Bl) of the light beam are directed to the Kosters prism system 1800.

The Kosters prism system 1800 has a 50:50 beam splitter coating 1805 at the adjoining faces of two right-angle prisms, prism 1810 and prism 1815 respectively. The two-beams are combined and directed to a detector 1820.

In the simplest arrangement, the detector 1820 has a diameter (Dd) that is smaller than a single beam profile size (Db): typically, Db<2*Dd. The detector integrates the total light intensity from the upper and lower beam portions. If the collimation of the light beam is adjusted, the detector output will be at a maximum when the light beam is collimated. A second detector or absorber 1825 can be placed at the symmetric Kosters prism output face to eliminate common-mode noise via subtractions.

If the light source is coherent (e.g., from a laser), the two beams will form an interference pattern at the detector plane. If the small detector is replaced with a one-dimensional array (2 or more elements), the spatial frequency (lines/millimeter) of the interference pattern will directly indicate the degree of collimation. In an enhanced system, illustrated in FIG. 18B, a second prism 1830 can be added at the output of the Kosters prism to amplify the angle between the lower and upper beams.

Accordingly, in certain embodiments, the present invention relates to a free-space communication optical terminal including, an optical telescope (or telescopes) for bidirectional communication and navigation, a pointing and tracking system for transmission and reception of narrow (typically <1 square-degree) optical beams, and a modem. The combination of several components disclosed herein, provide a high optical wave front quality in environments with external sources of thermal gradients (e.g., solar radiation). These components include a refractive telescope, such as telescope 1400, low thermal deformation composites or metals for telescope housing 1405 and shroud construction, the array of microheaters 1505, and thermistors 1510 used to minimize thermal gradients, a material or coating on the telescope body, gimbal and shroud to minimize thermal gradients, actuators (e.g. piezoelectric transducers 1440) to control the transmitter optical beam collimation and the receiver optical beam fiber coupling efficiency, and an optical system for transmitter collimation measurement. A multimode optical fiber receiver and multimode fiber optic amplifier can facilitate and maximize receiver optical coupling efficiency and reduce receiver pointing requirements.

High speed data from space-to-ground can be accomplished using the systems and methods disclosed herein. The embodiments can greatly improve science and telemetry in space. This is especially relevant for advanced imaging spacecraft, which can produce data volumes that are difficult for legacy RF systems to downlink in near-real-time. In certain embodiments, the system and methods can be employed, for example in association with the GOES-16 spacecraft operated by NOAA. In such embodiments, downlinks of more than a terabyte of information daily are possible. The disclosed laser communication system can provide greater than 10 Gbps downlink, and can transfer this volume in less than 15 minutes.

In certain embodiments, the laser communication can be used for very high data transfer speed data transfer for disaster relief, weather monitoring, and wartime operational support. As well, the systems and methods can support science missions where high-fidelity imaging at high framerates is required.

In other embodiments, ground-to-ground laser communication can be accomplished with the disclosed systems and methods. Such embodiments enable telecom service in underserved or hard-to-reach areas. The claimed embodiments offer significant cost savings over fiber optic connections and other such prior art, and can be implemented in locations where existing infrastructure is not in available or possible. The embodiments can therefore be used to create an optical network to facilitate points on a wired grid to visible locales off the grid, providing network connectivity at significantly lower cost with minimal infrastructure set up. In other embodiment the systems and methods can connect buildings on a campus or across town with a direct optical connection at high data rates via a standalone, local module within line-of-sight.

The transceiver disclosed herein is designed to be low-cost, and to provide an end-to-end integrated solution for software-defined laser communications that increases data rates as high as 1.2 Tbps. The systems and methods can also be deployed in spacecraft in the 200 kg or larger class, with sufficient plug-and-play extensibility to enable deep space relay, GEO, and LEO capabilities.

The embodiment thus provide the backbone of a complete architecture that can enable realization of optical communications in space and ground contexts. The embodiments can also be equipped with enhancements that intelligently leverage the communication system to improve spacecraft performance.

Based on the foregoing, it can be appreciated that a number of embodiments, preferred and alternative, are disclosed herein. It will be appreciated that variations of the above-disclosed and other features and functions, or alternatives thereof, may be desirably combined into many other different systems or applications.

For example, in an embodiment, a free-space communication optical terminal comprises an optical telescope (or telescopes) for bidirectional communication and navigation; a pointing and tracking system for transmission and reception of narrow (typically <1 square-degree) optical beams; and a modem. In an embodiment, the optical terminal device further comprises the telescope being an optical refractor telescope. In an embodiment, of the optical terminal device, the telescope body and optics is enclosed in an outer shell shroud. In an embodiment, the outer shell shroud is constructed from a metal or composite material that is manufacturable using compression, injection or other molding technique. In an embodiment, the telescope body is constructed from a metal or composite material that is manufacturable using compression, injection or other molding technique. In an embodiment, the shroud and telescope body are covered with high thermal conductivity material or coating. In an embodiment, the shroud and telescope-body emissivity are engineered with a paint or coating. In an embodiment, the transceiver is a commercial telecommunications optical transceiver. In an embodiment, the shroud, telescope body and optics are controlled by an array of microheaters and thermistors with a control system by way of control loops. In an embodiment, the commercial telecommunication receiver portion input is a multimode fiber (even if the transceiver's intended receiver input for fiber optic terrestrial communication is a single mode fiber). In an embodiment, the optical receiver is a multimode fiber optical amplifier. In an embodiment, at least one gimbal-rotary-stage mechanism is a piezoelectric-ultrasonic motor. In an embodiment, the distance between two optical terminals is measured using an algorithm with each terminal's clock recovery circuitry. In an embodiment, the angle between two optical terminals is measured using an algorithm with each terminal's available pointing sensors (spacecraft sensors, actuators, gimbals). In an embodiment, the distance and angular information is combined with the available platform sensors for navigation.

In certain embodiments, an optical terminal comprises an optical telescope configured to receive and transmit light signals, a pointing and tracking system, and a modem. The optical telescope further can further comprise an optical refractor telescope. The refractor telescope further comprises an aspheric lens and an aperture stop. In certain embodiments, the refractor telescope further comprises a quad cell detector.

In certain embodiments, the pointing and tracking system further comprises a fiber optic transmitter connected to a piezoelectric transducer configured for collimation adjustment and includes a fiber optic receiver. The pointing and tracking system can further comprise at least one ultrasonic piezoelectric rotary stage operably connected to a telescope shroud, the telescope shroud configured around the optical telescope.

In certain embodiments, the optical terminal further comprises a coating configured on a housing of the optical telescope, the coating comprising a thermally conductive coating.

In certain embodiments, the optical terminal further comprises an elevation gimbal configured to adjust the elevation of the shroud and an azimuth gimbal configured to adjust the azimuth of the shroud.

In certain embodiments, the optical terminal further comprises at least one microheater configured on the optical telescope and at least one thermistor configured on the optical telescope.

In certain embodiments, the optical telescope further comprises at least one kosters prism, the kosters prism comprising a first right angle prism and a second right angle prism joined together, and at least one detector. The kosters prism can further include a second prism configured in a beam path between the first right angle prism and the second right angle prism joined together and the at least one detector.

In another embodiment, a communications system comprises a transceiver operably connected with an optical telescope configured to receive and transmit light signals; a pointing and tracking system configured to control the attitude of the optical telescope; and a modem. In certain embodiments, the pointing and tracking system further comprises at least one ultrasonic piezoelectric rotary stages operably connected to a telescope shroud, the telescope shroud configured around the optical telescope, an elevation gimbal configured to adjust the elevation of the shroud, and an azimuth gimbal configured to adjust the azimuth of the shroud. In certain embodiments, the communications system further comprises at least one microheater configured on the optical telescope and at least one thermistor configured on the optical telescope. In an embodiment, the optical telescope further comprises at least one kosters prism, the kosters prism comprising a first right angle prism and a second right angle prism joined together, and at least one detector.

In an embodiment, a communications system comprising a transceiver operably connected with an optical telescope configured to receive and transmit light signals, a pointing and tracking system comprising: at least one ultrasonic piezoelectric rotary stages operably connected to a telescope shroud, the telescope shroud configured around the optical telescope; an elevation gimbal configured to adjust the elevation of the shroud; and an azimuth gimbal 645 configured to adjust the azimuth of the shroud; and a modem. In an embodiment, the transceiver further comprises a laser source and a modulation driver operably connected to a laser modulator and an optical receiver operably connected to a signal decoder.

It should be appreciated that various presently unforeseen or unanticipated alternatives, modifications, variations or improvements therein may be subsequently made by those skilled in the art which are also intended to be encompassed by the following claims.

What is claimed is:
1. An optical terminal comprising:
an optical telescope configured to receive and transmit light signals comprising:
a housing for the optical telescope;
a first arm with a mirror in a first beam path of a fiber optic transmitter and piezoelectric transducer, a collimator between the mirror and the fiber optic transmitter, and a thin film Dichroic filter; and
a second arm with a fiber optic receiver configured in a second beam path to a focusing lens and a second mirror, the second mirror configured with a fast steering mirror actuator;
a coating configured on the housing of the optical telescope, the coating comprising an emissive thermally conductive coating, wherein the housing is comprised of a continuous carbon fiber configured to minimize the overall thermal response of the optical terminal;
two ultrasonic piezoelectric rotary stages operably connected to the optical telescope;
a base housing configured to house the modem;
a base piezoelectric rotary stage fitted to the base housing;
a pointing and tracking system; and
a modem.
2. The optical terminal of claim 1 wherein the optical telescope further comprises:
an optical refractor telescope.
3. The optical terminal of claim 2 wherein the refractor telescope further comprises:
an aspheric lens; and
an aperture stop at a focal point of an objective lens of the optical telescope.
4. The optical terminal of claim 2 wherein the first beam path and the second beam path intersect at a partial reflecting mirror, through a blur lens and onto a quad cell detector.
5. The optical terminal of claim 4 further comprising:
a plurality of microheaters integrated in the housing of the refractor telescope.
6. The optical terminal of claim 2 wherein the pointing and tracking system further comprises:
a multimode fiber optic amplifier.
7. The optical terminal of claim 1 wherein the piezoelectric transducer is configured for collimation adjustment.

8. The optical terminal of claim 1 further comprising: an elevation gimbal configured to adjust elevation of the shroud.

9. The optical terminal of claim 1 further comprising: an azimuth gimbal configured to adjust azimuth of the shroud.

10. The optical terminal of claim 1 further comprising:
at least one thermistor configured on the optical telescope.

11. The optical terminal of claim 1 wherein the optical telescope further comprises:
at least one kosters prism, the kosters prism comprising a first right angle prism and a second right angle prism joined together, and at least one detector configured to eliminate common-mode noise via subtractions.

12. The optical terminal of claim 11 wherein the kosters prism further comprises:
a second prism configured in a beam path between the first right angle prism and the second right angle prism joined together and the at least one detector configured to eliminate common-mode noise via subtractions.

13. A communications system comprising:
a transceiver operably connected with an optical telescope configured to receive and transmit light signals the optical telescope comprising:
a housing for the telescope;
a first arm with a mirror in a first beam path of a fiber optic transmitter and piezoelectric transducer, a collimator between the mirror and the fiber optic transmitter, and a thin film Dichroic filter;
a second arm with a fiber optic receiver configured in a second beam path to a focusing lens and a second mirror, the second mirror configured with a fast steering mirror actuator;
an aspheric lens;
an aperture stop at a focal point of an objective lens of the optical telescope;
wherein the first beam path and the second beam path intersect at a partial reflecting mirror, through a blur lens and onto a quad cell detector;
a pointing and tracking system configured to control attitude of the optical telescope; and
a modem.

14. The communications system of claim 13 wherein the pointing and tracking system further comprises:
two ultrasonic piezoelectric rotary stages operably connected to a telescope shroud, the telescope shroud configured around the optical telescope;
an elevation gimbal configured to adjust elevation of the shroud; and
an azimuth gimbal configured to adjust azimuth of the shroud;
a base housing configured to house the modem; and
a base piezoelectric rotary stage fitted to the base housing.

15. The communications system of claim 13 further comprising:
at least one microheater integrated in the housing of the optical telescope; and
at least one thermistor configured on the optical telescope.

16. The communications system of claim 13 wherein the optical telescope further comprises:
at least one kosters prism, the kosters prism comprising a first right angle prism and a second right angle prism joined together, and at least one detector configured to eliminate common-mode noise via subtractions.

17. A communications system comprising:
a transceiver operably connected with an optical telescope configured to receive and transmit light signals the optical telescope comprising;
a first arm with a mirror in a first beam path of a fiber optic transmitter and piezoelectric transducer, a collimator between the mirror and the fiber optic transmitter, and a thin film Dichroic filter;
a second arm with a fiber optic receiver configured in a second beam path to a focusing lens and a second mirror, the second mirror configured with a fast steering mirror actuator; and
at least one kosters prism, the kosters prism comprising a first right angle prism and a second right angle prism joined together, and at least one detector configured to eliminate common-mode noise via subtractions;
a pointing and tracking system comprising:
at least one ultrasonic piezoelectric rotary stages operably connected to a telescope shroud, the telescope shroud configured around the optical telescope;
an elevation gimbal configured to adjust elevation of the shroud; and
an azimuth gimbal configured to adjust azimuth of the shroud;
a modem;
a base housing configured to house the modem; and
a base piezoelectric rotary stage fitted to the base housing.

18. The communications system of claim 17 wherein the transceiver further comprises
a laser source and a modulation driver operably connected to a laser modulator; and
an optical receiver operably connected to a signal decoder.

* * * * *